US012562118B2

(12) United States Patent
Kim

(10) Patent No.: US 12,562,118 B2
(45) Date of Patent: *Feb. 24, 2026

(54) PIXEL WITH GATE OF DRIVING TRANSISTOR DIRECTLY CONNECTED TO DRAIN AND DISPLAY DEVICE INCLUDING THE SAME

(71) Applicant: SAMSUNG DISPLAY CO., LTD., Yongin-si (KR)

(72) Inventor: Keunwoo Kim, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/887,017

(22) Filed: Sep. 16, 2024

(65) Prior Publication Data

US 2025/0014516 A1 Jan. 9, 2025

Related U.S. Application Data

(63) Continuation of application No. 18/311,806, filed on May 3, 2023, now Pat. No. 12,094,413.

(30) Foreign Application Priority Data

Jul. 7, 2022 (KR) ........................ 10-2022-0083944

(51) Int. Cl.
*G09G 3/3233* (2016.01)

(52) U.S. Cl.
CPC ... *G09G 3/3233* (2013.01); *G09G 2300/0426* (2013.01); *G09G 2300/0842* (2013.01); *G09G 2310/061* (2013.01); *G09G 2310/08* (2013.01)

(58) Field of Classification Search
CPC ... G09G 2300/0426; G09G 2300/0842; G09G 2300/0866; G09G 2310/0262; G09G 2310/061; G09G 2310/08; G09G 2320/045; G09G 2330/00; G09G 3/3233; H10K 59/1216; H05B 45/60
See application file for complete search history.

(56) References Cited

U.S. PATENT DOCUMENTS

| | | | |
|---|---|---|---|
| 8,913,044 | B2 | 12/2014 | Miyazawa |
| 10,482,817 | B2 | 11/2019 | Kim et al. |
| 10,593,271 | B1 | 3/2020 | Chen |
| 10,984,725 | B1 | 4/2021 | He et al. |
| 2003/0063053 | A1 | 4/2003 | Yamazaki et al. |

(Continued)

FOREIGN PATENT DOCUMENTS

| | | |
|---|---|---|
| CN | 108154846 | 6/2018 |
| KR | 10-2018-0064619 | 6/2018 |
| KR | 10-2215242 | 2/2021 |

*Primary Examiner* — Richard J Hong
(74) *Attorney, Agent, or Firm* — Womble Bond Dickinson (US) LLP

(57) ABSTRACT

A pixel according to one or more embodiments of the present disclosure may include a transistor including a gate terminal connected to a first node, a first terminal connected to a first power, and a second terminal connected to a second node having a same potential as the first node, a capacitor including a first capacitor terminal connected to a data power, and a second capacitor terminal connected to the first node, and a light emitting diode including a first diode terminal connected to the second node, and a second diode terminal connected to a second power.

20 Claims, 16 Drawing Sheets

(56) References Cited

U.S. PATENT DOCUMENTS

| | | | | |
|---|---|---|---|---|
| 2003/0098829 | A1 | 5/2003 | Chen et al. | |
| 2010/0194720 | A1 | 8/2010 | Miyazawa | |
| 2011/0164071 | A1* | 7/2011 | Chung | H05B 45/60 315/291 |
| 2014/0139503 | A1 | 5/2014 | Han | |
| 2015/0154914 | A1 | 6/2015 | Han | |
| 2020/0210010 | A1* | 7/2020 | Kim | G09G 3/3233 |
| 2021/0125544 | A1 | 4/2021 | Park | |
| 2021/0134224 | A1 | 5/2021 | He et al. | |
| 2022/0376026 | A1 | 11/2022 | Nishiyama | |
| 2023/0059858 | A1* | 2/2023 | Hong | H10K 59/1216 |
| 2025/0072219 | A1* | 2/2025 | Hong | G09G 3/3233 |

* cited by examiner

PIXEL WITH GATE OF DRIVING TRANSISTOR DIRECTLY CONNECTED TO DRAIN AND DISPLAY DEVICE INCLUDING THE SAME

CROSS-REFERENCE TO RELATED APPLICATIONS

This application is a continuation of U.S. patent application Ser. No. 18/311,806, filed May 3, 2023, which claims priority to and the benefit of Korean Patent Application No. 10-2022-0083944, filed Jul. 7, 2022, the entire content of both of which is incorporated herein by reference.

BACKGROUND

1. Field

Embodiments relate to a pixel and to a display device including the same.

2. Description Of The Related Art

Each pixel of a display device may include a plurality of transistors and capacitors for data writing, driving a light emitting diode, threshold voltage compensation, light emitting control, driving transistor initialization, anode initialization, storage capacitor initialization, and the like. When a pixel has a relatively complex structure by such a plurality of transistors and capacitors, a reduction in an area of a pixel and implementation of a high-resolution display device may be limited.

SUMMARY

Embodiments provide a pixel for implementing a high-resolution display device.

Embodiments provide a display device including the pixel.

A pixel according to one or more embodiments of the present disclosure may include a transistor including a gate terminal connected to a first node, a first terminal connected to a first power, and a second terminal connected to a second node having a same potential as the first node, a capacitor including a first capacitor terminal connected to a data power, and a second capacitor terminal connected to the first node, and a light emitting diode including a first diode terminal connected to the second node, and a second diode terminal connected to a second power.

The first node may be directly connected to the second node.

There might be no transistor connected between the first node and the second node.

The second terminal may be directly connected to the second node.

The first capacitor terminal may be directly connected to the data power.

The first diode terminal may be directly connected to the second node.

A frame period for the pixel may include an initialization period during which the gate terminal is initialized, a compensation period during which a threshold voltage of the transistor is compensated, a data writing period during which the data power is applied to the first node, and a light emitting period during which the light emitting diode emits light.

The first power may have a first voltage level, and a second voltage level that is greater than the first voltage level, wherein the data power has a third voltage level, and a fourth voltage level that is greater than the third voltage level, and wherein the second power has a fifth voltage level equal to the first voltage level, and a sixth voltage level that is equal to the second voltage level.

In the initialization period, the first power has the first voltage level, the data power has the third voltage level, and the second power has the fifth voltage level.

In the compensation period, the first power has the second voltage level, the data power has the third voltage level, and the second power has the sixth voltage level.

In the data writing period, the first power has the first voltage level, the data power has the fourth voltage level, and the second power has the fifth voltage level.

In the light emitting period, the first power has the second voltage level, the data power has the fourth voltage level, and the second power has the fifth voltage level.

The transistor may further include a back gate terminal.

A frame period for the pixel may include an initialization period during which the gate terminal is initialized, a compensation period during which a threshold voltage of the transistor is compensated, a data writing period during which the data power is applied to the first node, and a light emitting period during which the light emitting diode emits light, and wherein a back gate voltage having a negative polarity is applied to the back gate terminal in the compensation period.

A display device according to one or more embodiments of the present disclosure may include a substrate, an active pattern above the substrate, and including a source region, a drain region, and a channel region between the source region and the drain region, a first gate electrode above the active pattern, overlapping the channel region, and connected to the drain region, a second gate electrode above the first gate electrode, and overlapping the first gate electrode, a first electrode above the second gate electrode, and connected to the drain region, an organic light emitting layer above the first electrode, and a second electrode above the organic light emitting layer.

The display device may further include a first gate insulating layer above the active pattern, wherein a contact hole is defined in the first gate insulating layer, and wherein the first gate electrode contacts the drain region through the contact hole.

The display device may further include a back gate pattern under the active pattern and overlapping the channel region.

A display device according to one or more embodiments of the present disclosure may include a substrate, a back gate pattern above the substrate, an active pattern above the back gate pattern, and including a source region, a drain region connected to the back gate pattern, and a channel region between the source region and the drain region, a capacitor electrode above the back gate pattern and overlapping the back gate pattern, a gate electrode above the active pattern and overlapping the channel region, a first electrode above the gate electrode and connected to the drain region, an organic light emitting layer above the first electrode, and a second electrode above the organic light emitting layer.

The capacitor electrode may be above a same layer as the active pattern.

The capacitor electrode may be above a same layer as the gate electrode.

In a display device including a pixel, according to embodiments of the present disclosure, the pixel may include a transistor, a capacitor and a light emitting diode, and may not include a separate switching transistor. Accordingly, the area of the pixel may be reduced, and the display device may be implemented as a high-resolution display device having a relatively high PPI (pixels per inch).

DETAILED DESCRIPTION

Figure 1:
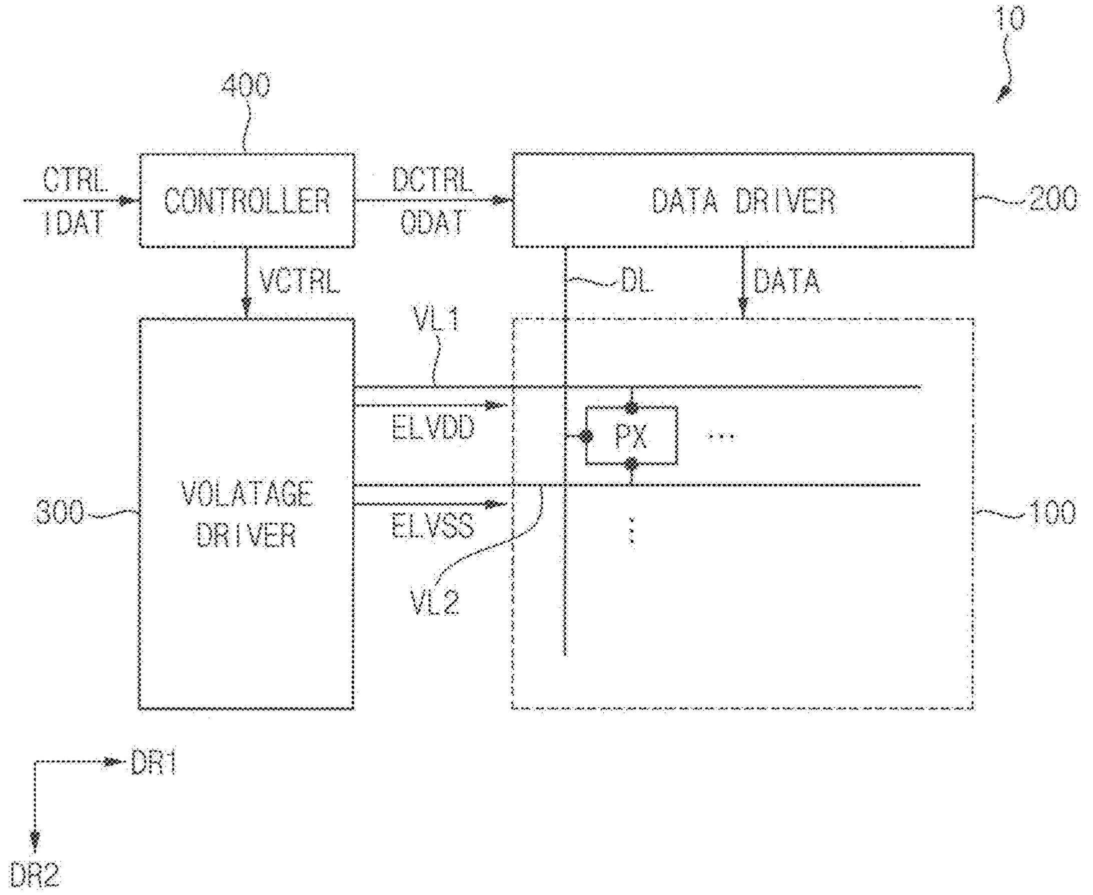
FIG. 1 is a block diagram illustrating a display device according to one or more embodiments.

Aspects of some embodiments of the present disclosure and methods of accomplishing the same may be understood more readily by reference to the detailed description of embodiments and the accompanying drawings. Hereinafter, embodiments will be described in more detail with reference to the accompanying drawings. The described embodiments, however, may have various modifications and may be embodied in different forms, and should not be construed as being limited to only the illustrated embodiments herein. Rather, these embodiments are provided as examples so that this disclosure will be thorough and complete, and will fully convey the aspects of the present disclosure to those skilled in the art, and it should be understood that the present disclosure covers all the modifications, equivalents, and replacements within the idea and technical scope of the present disclosure. Accordingly, processes, elements, and techniques that are not necessary to those having ordinary skill in the art for a complete understanding of the aspects of the present disclosure may not be described.

Unless otherwise noted, like reference numerals, characters, or combinations thereof denote like elements throughout the attached drawings and the written description, and thus, descriptions thereof will not be repeated. Further, parts that are not related to, or that are irrelevant to, the description of the embodiments might not be shown to make the description clear.

In the drawings, the relative sizes of elements, layers, and regions may be exaggerated for clarity. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place.

Thus, the regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit or scope of the present disclosure.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form to avoid unnecessarily obscuring various embodiments.

Spatially relative terms, such as “beneath,” “below,” “lower,” “lower side,” “under,” “above,” “upper,” “upper side,” and the like, may be used herein for ease of explanation to describe one element or feature’s relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as “below,” “beneath,” “or “under” other elements or features would then be oriented “above” the other elements or features. Thus, the example terms “below” and “under” can encompass both an orientation of above and below. The device may be otherwise oriented (e.g., rotated 90 degrees or at other orientations) and the spatially relative descriptors used herein should be interpreted accordingly. Similarly, when a first part is described as being arranged “on” a second part, this indicates that the first part is arranged at an upper side or a lower side of the second part without the limitation to the upper side thereof on the basis of the gravity direction.

Further, the phrase "in a plan view" means when an object portion is viewed from above, and the phrase "in a schematic cross-sectional view" means when a schematic cross-section taken by vertically cutting an object portion is viewed from the side. The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art. The expression "not overlap" may include meaning, such as "apart from" or "set aside from" or "offset from" and any other suitable equivalents as would be appreciated and understood by those of ordinary skill in the art. The terms "face" and "facing" may mean that a first object may directly or indirectly oppose a second object. In a case in which a third object intervenes between a first and second object, the first and second objects may be understood as being indirectly opposed to one another, although still facing each other.

It will be understood that when an element, layer, region, or component is referred to as being "formed on," "on," "connected to," or "coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or intervening layers, regions, or components may be present. However, "directly connected/directly coupled," or "directly on," refers to one component directly connecting or coupling another component, or being on another component, without an intermediate component. In addition, in the present specification, when a portion of a layer, a film, an area, a plate, or the like is formed on another portion, a forming direction is not limited to an upper direction but includes forming the portion on a side surface or in a lower direction. On the contrary, when a portion of a layer, a film, an area, a plate, or the like is formed "under" another portion, this includes not only a case where the portion is "directly beneath" another portion but also a case where there is further another portion between the portion and another portion. Meanwhile, other expressions describing relationships between components, such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

Some embodiments are described in the accompanying drawings in relation to functional block, unit, and/or module. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the present disclosure. In addition, in some embodiments, the block, unit and/or module may be physically combined into more complex blocks, units, and/or modules without departing from the scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a block diagram illustrating a display device according to one or more embodiments.

Referring to FIG. 1, a display device 10 according to one or more embodiments may include a display panel 100, and a panel driver for driving the display panel 100. The panel driver may drive the display panel 100 in a concurrent or substantially simultaneous light emitting method including a non-light emitting period, during which a pixel PX does not emit light, and a light emitting period, during which the pixel(s) PX emits light at the same time. The panel driver may include a data driver 200, a power supply (e.g. voltage driver) 300, and a controller 400

The display panel 100 may include at least one pixel PX to display an image. The pixel PX may emit light having a corresponding or preset color. The pixel PX may emit red, green, or blue light. The pixel PX may include a pixel circuit (e.g., a pixel circuit PXC of FIG. 2) and a light emitting diode (e.g., a light emitting diode LD of FIG. 2).

The data driver 200 may generate a data power DATA based on an output image data ODAT and a data control signal DCTRL. For example, the data driver 200 may generate the data power DATA corresponding to the output image data ODAT, and may output the data power DATA in response to the data control signal DCTRL. The output image data ODAT may be RGB data for an image displayed on the display panel 100, and the data control signal DCTRL may include an output data enable signal, a horizontal start signal, and a load signal. The data driver 200 may output the data power DATA through a data line DL. For example, the data driver 200 may output the data power DATA to the pixel PX through the data line DL. In one or more embodiments, the data driver 200 may be mounted on the display panel 100 or may be integrated in a peripheral portion of the display panel 100. In one or more other embodiments, the data driver 200 may be implemented with one or more integrated circuits (ICs).

The power supply 300 may provide a first power ELVDD and a second power ELVSS having a voltage level that is periodically changed within a frame period based on a power control signal VCTRL. For example, the power supply 300 may output the first power ELVDD to the pixel PX through a first power line VL1, and may output the second power ELVSS to the pixel PX through a second power line VL2. In one or more embodiments, the power supply 300 may be mounted on the display panel 100 or may be integrated in a peripheral portion of the display panel 100. In one or more other embodiments, the power supply 300 may be implemented with one or more integrated circuits (ICs).

The controller 400 (e.g., a timing controller T-CON) may receive an input image data IDAT and a control signal CTRL from an external host processor (e.g., GPU). For example, the input image data IDAT may be RGB data including red image data, green image data, and blue image data. The controller 400 may generate the data control signal DCTRL, the output image data ODAT, and the power control signal VCTRL based on the input image data IDAT and the control signal CTRL.

Figure 2:
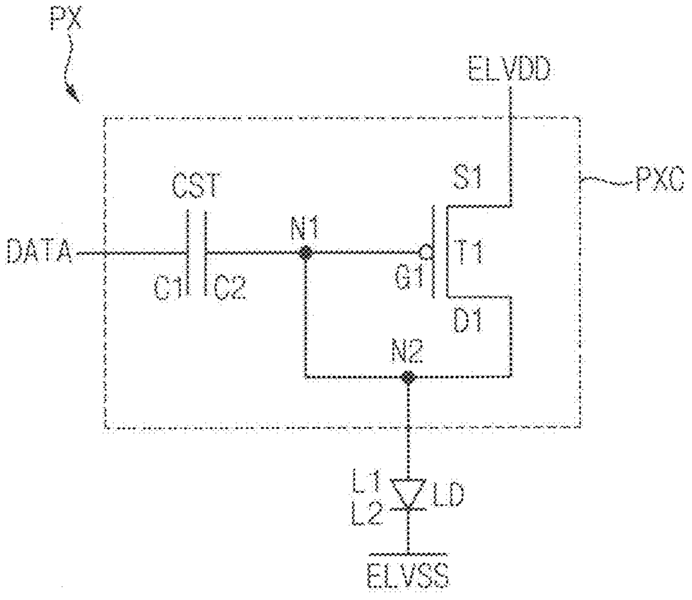
FIG. 2 is a circuit diagram for describing a pixel included in the display device of FIG. 1.

FIG. 2 is a circuit diagram for describing a pixel included in the display device of FIG. 1.

Referring to FIGS. 1 and 2, the pixel PX may include a pixel circuit PXC and a light emitting diode LD. The pixel PX may be driven through the pixel circuit PXC. In one or more embodiments, the pixel PX may include a transistor T1 and a capacitor CST. The pixel PX may be located in an i-th pixel row (where i is an integer between 1 and n) and a j-th pixel column (where j is an integer between 1 and m).

The transistor T1 may be a driving transistor. In one or more embodiments, the transistor T1 may include a gate terminal G1 connected to a first node N1, a first terminal S1 connected to the first power ELVDD, and a second terminal D1 connected to a second node N2. The second node N2 may have a same potential as the first node N1. For example, the first node N1 may be directly connected to the second node N2. That is, a transistor may not be connected between the first node N1 and the second node N2 (there might be no transistor connected between the first node N1 and the second node N2). Also, the second terminal D1 may be directly connected to the second node N2.

The capacitor CST may be connected between the data power DATA and the first node N1. In one or more embodiments, the capacitor CST may include a first capacitor terminal C1 connected to the data power DATA, and a second capacitor terminal C2 connected to the first node N1. For example, the first capacitor terminal C1 may be directly connected to the data power DATA.

The light emitting diode LD may emit light based on a driving current IDR (e.g., see FIG. 7) generated by the transistor T1. In one or more embodiments, the light emitting diode LD may include a first diode terminal L1 connected to the second node N2, and a second diode terminal L2 connected to the second power ELVSS. For example, the first diode terminal L1 may be directly connected to the second node N2. The first diode terminal L1 of the light emitting diode LD may be an anode terminal, and the second diode terminal L2 of the light emitting diode LD may be a cathode terminal.

Figure 3:
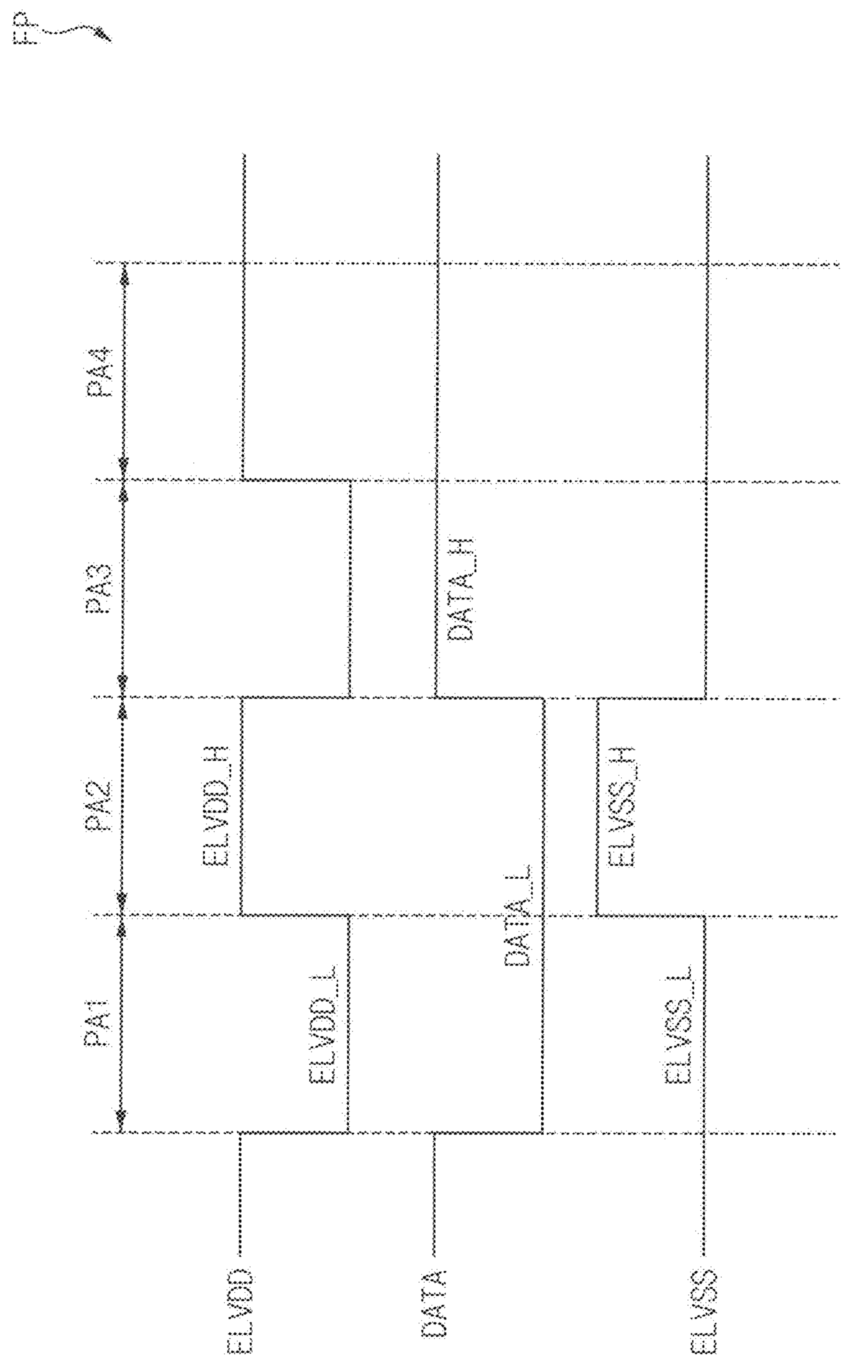
FIG. 3 is a timing diagram for describing an operation of the pixel of FIG. 2.

FIG. 3 is a timing diagram for describing an operation of the pixel of FIG. 2.

Referring to FIGS. 2 and 3, a frame period FP for the pixel PX includes a non-light emitting period, during which the pixel PX does not emit light, and a light emitting period PA4, during which the pixel PX emits light. The non-light emitting period may sequentially include an initialization period PA1, during which the gate terminal G1 of the transistor T1 is initialized, a compensation period PA2, during which a threshold voltage of the transistor T1 is compensated, and a data writing period PA3, during which the data power DATA is applied.

The pixel PX may be connected to the first power ELVDD, to the data power DATA, and to the second power ELVSS having a voltage level that is periodically changed within the frame period FP. For example, the first power ELVDD may have a first voltage level ELVDD_L, and a second voltage level ELVDD_H that is greater than the first voltage level ELVDD_L. The data power DATA may have a third voltage level DATA_L, and a fourth voltage level DATA_H that is greater than the third voltage level DATA_L. The second power ELVSS may have a fifth voltage level ELVSS_L, and a sixth voltage level ELVSS_H that is greater than the fifth voltage level ELVSS_L. For example, the fifth voltage level ELVSS_L may be equal to the first voltage level ELVDD_L, and the sixth voltage level ELVSS_H may be equal to the second voltage level ELVDD_H.

Figure 4:
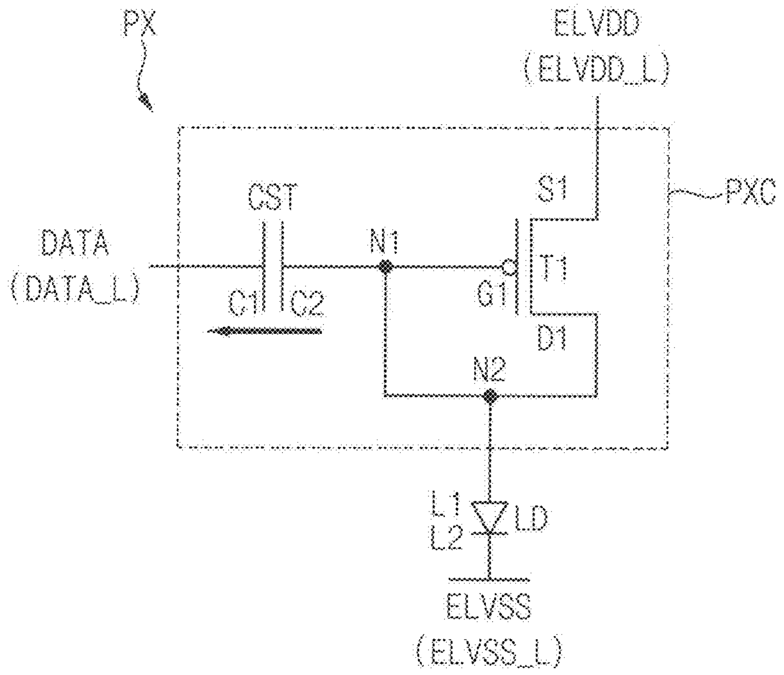
FIGS. 4, 5, 6, and 7 are circuit diagrams for describing an operation of the pixel of FIG. 2.
Figure 5:
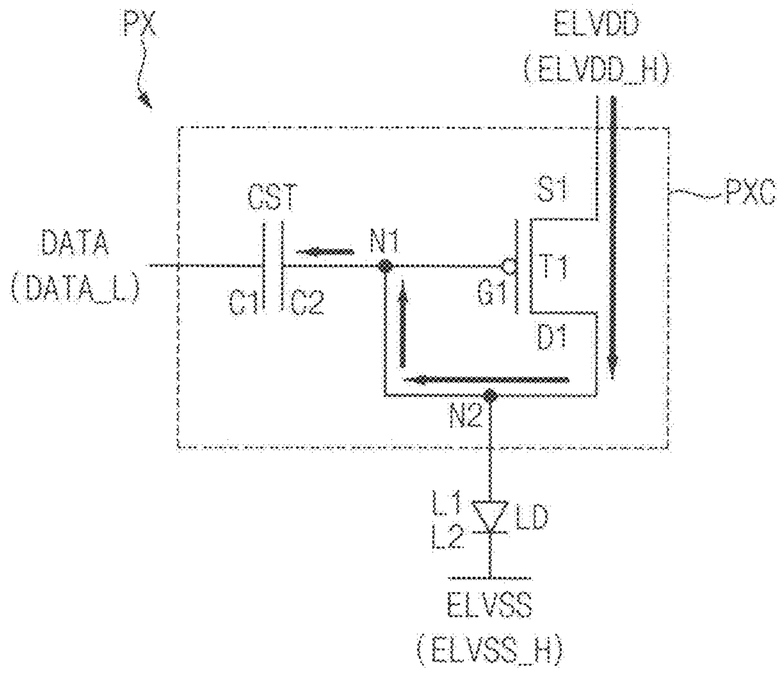
Figure 6:
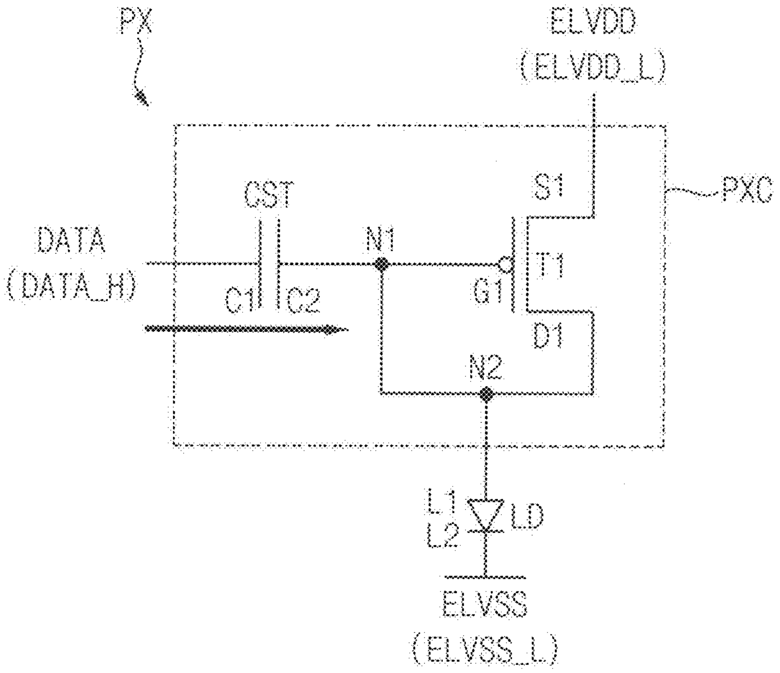
Figure 7:
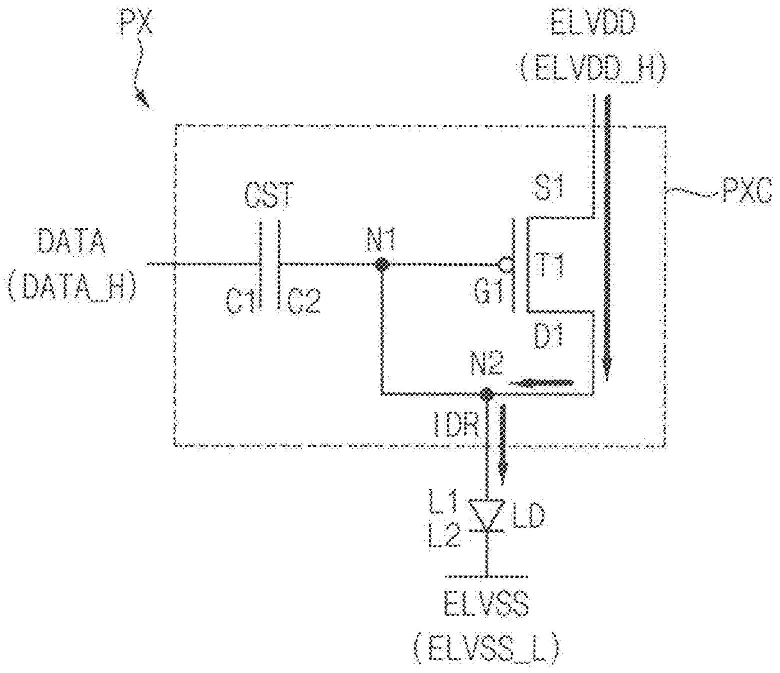

FIGS. 4, 5, 6, and 7 are circuit diagrams for describing an operation of the pixel of FIG. 2. For example, FIG. 4 is a circuit diagram for describing an operation of the pixel in the initialization period PA1, FIG. 5 is a circuit diagram for describing an operation of the pixel in the compensation period PA2, FIG. 6 is a circuit diagram for describing an operation of the pixel in the data writing period PA3, and FIG. 7 is a circuit diagram for describing an operation of the pixel in the light emitting period PA4.

Referring to FIGS. 3 and 4, in the initialization period PA1, the first power ELVDD may have the first voltage level ELVDD_L, the data power DATA may have the third voltage level DATA_L, and the second power ELVSS may have the fifth voltage level ELVSS_L. Accordingly, a current may flow to the capacitor CST through the first node N1, and a voltage of the first node N1 may be set to the first voltage level ELVDD_L. That is, a voltage of the gate terminal G1 of the transistor T1 may be initialized. For example, each of the first voltage level ELVDD_L, the third voltage level DATA_L and the fifth voltage level ELVSS_L may be about −3V, but the present disclosure is not limited thereto.

Referring to FIGS. 3 and 5, in the compensation period PA2, the first power ELVDD may have the second voltage level ELVDD_H, the data power DATA may have the third voltage level DATA_L, and the second power ELVSS may have the sixth voltage level ELVSS_H. Accordingly, the transistor T1 may be diode-connected, and a voltage of the first node N1 may be a voltage obtained by subtracting a threshold voltage Vth of the transistor T1 from the second voltage level ELVDD_H (e.g., ELVDD_H-Vth). That is, a threshold voltage of the transistor T1 may be compensated. For example, each of the second voltage level ELVDD_H and the sixth voltage level ELVSS_H may be about 4V, and the third voltage level DATA_L may be about −3V, but the present disclosure is not limited thereto.

Referring to FIGS. 3 and 6, in the data writing period PA3, the first power ELVDD may have the first voltage level ELVDD_L, the data power DATA may have the fourth voltage level DATA_H, and the second power ELVSS may have the fifth voltage level ELVSS_L. The data power DATA may apply the fourth voltage level DATA_H to the capacitor CST. Accordingly, a voltage of the first capacitor terminal C1 and the second capacitor terminal C2 of the capacitor CST, that is, a voltage of the first node N1 may be a voltage obtained by subtracting the threshold voltage Vth from the second voltage level ELVDD_H (e.g., ELVDD_H-Vth) and adding the fourth voltage level DATA_H (e.g., ELVDD_H−Vth+DATA_H). For example, each of the first voltage level ELVDD_L and the fifth voltage level ELVSS_L may be about −3V, and the fourth voltage level DATA_H may be about 4V, but the present disclosure is not limited thereto.

Referring to FIGS. 3 and 7, in the light emitting period PA4, the first power ELVDD may have the second voltage level ELVDD_H, the data power DATA may have the fourth voltage level DATA_H, and the second power ELVSS may have the fifth voltage level ELVSS_L. Accordingly, the transistor T1 may generate the driving current IDR based on the voltage (ELVDD_H−Vth+DATA_H) of the first node N1, and may provide the driving current IDR to the light emitting diode LD. The light emitting diode LD may emit light based on the driving current IDR. Meanwhile, the driving current IDR generated by the transistor T1 may be determined by the equation "β/2*(Vsg−Vth)^2". Here, β is a transistor gain determined by a mobility, capacitance, width and length of the transistor T1, Vsg is a source-gate voltage of the transistor T1, and Vth is a threshold voltage of the transistor T1. Meanwhile, because a source voltage of the transistor T1 may be the second voltage level ELVDD_H, and because a gate voltage of the transistor T1 may be a voltage of the first node N1, that is, "ELVDD_H−Vth+DATA_H," therefore, "Vsg−Vth" may be "ELVDD_H−ELVDD_H+Vth−DATA_H−Vth=−DATA_H". Accordingly, the driving current IDR may be determined based on the data DATA regardless of the threshold voltage Vth of the transistor T1. For example, each of the second voltage level ELVDD_H and the fourth voltage level DATA_H may be about 4V and the fifth voltage level ELVSS_L may be about −3V, but the present disclosure is not limited thereto.

Figure 8:
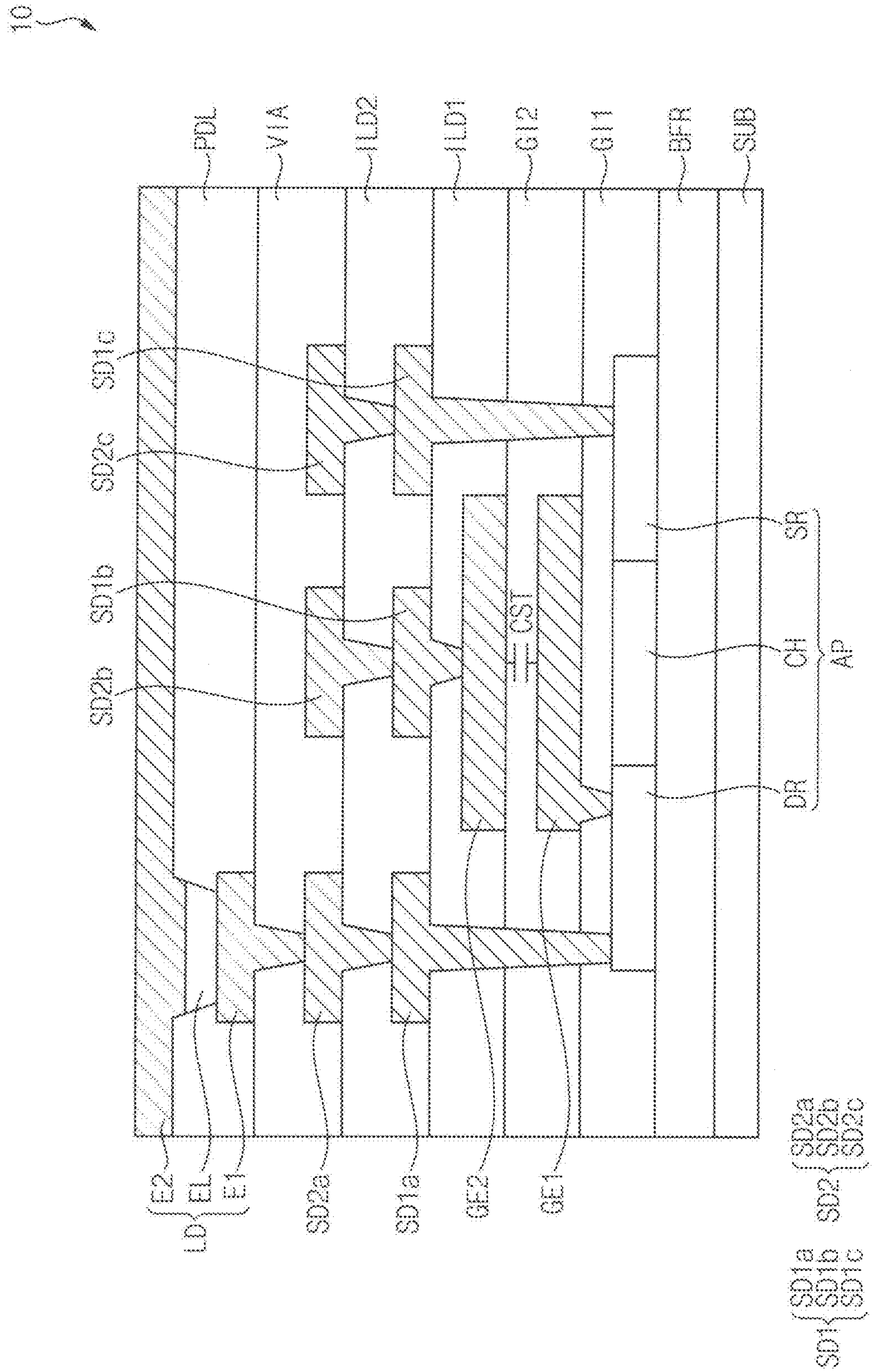
FIG. 8 is a cross-sectional view for describing the display device of FIG. 1.

FIG. 8 is a cross-sectional view for describing the display device of FIG. 1.

Referring to FIG. 8, the display device 10 may include a substrate SUB, a buffer layer BFR, an active pattern AP, a first gate insulating layer GI1, a first gate electrode GE1, a second gate insulating layer GI2, a second gate electrode GE2, a first interlayer insulating layer ILD1, a first conductive layer SD1, a second interlayer insulating layer ILD2, a second conductive layer SD2, a via insulating layer VIA, a first electrode E1, a pixel defining layer PDL, an light emitting layer EL, and a second electrode E2.

The substrate SUB may be a transparent insulating substrate including glass, quartz, plastic, and the like. In one or more embodiments, the substrate SUB may include a first plastic layer, a first barrier layer located on the first plastic layer, a second plastic layer located on the first barrier layer, and a second barrier layer located on the second plastic layer.

The first plastic layer and the second plastic layer may include an organic insulating material, such as polyimide and the like. The first barrier layer and the second barrier layer may include an inorganic insulating material, such as silicon oxide, silicon nitride, amorphous silicon, and the like. For example, the first barrier layer may have a multilayer structure including an amorphous silicon layer and a silicon oxide layer located on the amorphous silicon layer, and the second barrier layer may have a single-layer structure including a silicon oxide layer.

The buffer layer BFR may be located on the substrate SUB. The buffer layer BFR may reduce or prevent metal atoms or impurities diffusing into the active pattern AP. In addition, the buffer layer BFR may control a heat supply rate during a crystallization process for forming the active pattern AP. The material constituting the buffer layer BFR may be silicon oxide, silicon nitride, silicon oxynitride, and the like. The above substances may be used alone or in combination. The buffer layer BFR may have a single-layer or multi-layer structure.

The active pattern AP may be located on the buffer layer BFR. In one or more embodiments, the material constituting the active pattern AP may include a silicon semiconductor. For example, the active pattern AP may be made of amorphous silicon, polycrystalline silicon, and the like. The above substances may be used alone or in combination.

The active pattern AP may include a source region SR, a drain region DR and a channel region CH. For example, the active pattern AP may include the source region SR, the drain region DR, and a channel region CH formed between the source region SR and the drain region DR. The source region SR and the drain region DR may serve as the first terminal S1 and the second terminal D1 of the transistor T1, respectively.

The first gate insulating layer GI1 may cover the active pattern AP, and may be located on the buffer layer BFR. The first gate insulating layer GI1 may include an insulating material. For example, the first gate insulating layer GI1 may include silicon oxide, silicon nitride, silicon oxynitride, and the like. The above substances may be used alone or in combination. The first gate insulating layer GI1 may have a single-layer or multi-layer structure.

The first gate electrode GE1 may be located on the first gate insulating layer GI1. The first gate electrode GE1 may be located in an island shape. The first gate electrode GE1 may constitute the transistor T1 together with the active pattern AP. In one or more embodiments, the first gate electrode GE1 may contact the drain region DR of the active pattern AP through a contact hole formed in the first gate insulating layer GI1. For example, the first gate electrode GE1 may correspond to the gate terminal G1 of the transistor T1 described with reference to FIG. 2.

The first gate electrode GE1 may include a metal, an alloy, a conductive metal oxide, a transparent conductive material, and the like. For example, the first gate electrode GE1 may include silver (Ag), an alloy containing silver, molybdenum (Mo), an alloy containing molybdenum, aluminum (Al), an alloy containing aluminum, aluminum nitride (AlN), tungsten (W), tungsten nitride (WN), copper (Cu), nickel (Ni), chromium (Cr), chromium nitride (CrN), titanium (Ti), tantalum (Ta), platinum ("Pt), scandium (Sc), indium tin oxide (ITO), indium zinc oxide (IZO), and the like.

The second gate insulating layer GI2 may cover the first gate electrode GE1 and may be located on the first gate insulating layer GI1. The second gate insulating layer GI2 may include an insulating material. For example, the second gate insulating layer GI2 may include silicon oxide, silicon nitride, silicon oxynitride, and the like. The above substances may be used alone or in combination. The second gate insulating layer GI2 may have a single-layer or multi-layer structure.

The second gate electrode GE2 may be located on the second gate insulating layer GI2. In one or more embodiments, the second gate electrode GE2 and the first gate electrode GE1 may constitute the capacitor CST. For example, the second gate electrode GE2 may overlap the first gate electrode GE1, and the data power DATA may be provided to the second gate electrode GE2.

The second gate electrode GE2 may include a metal, an alloy, a conductive metal oxide, a transparent conductive material, and the like. For example, the second gate electrode GE2 may include a metal, such as molybdenum (Mo), aluminum (Al), copper (Cu), titanium (Ti), and the like.

The first interlayer insulating layer ILD1 may cover the second gate electrode GE2, and may be located on the second gate insulating layer GI2. The first interlayer insulating layer ILD1 may include an insulating material. For example, the insulating material constituting the first interlayer insulating layer ILD1 may be silicon oxide, silicon nitride, silicon oxynitride, aluminum oxide, and the like. The above substances may be used alone or in combination.

The first conductive layer SD1 may be located on the first interlayer insulating layer ILD1. The first conductive layer SD1 may include a first connection electrode SD1*a*, a second connection electrode SD1*b*, and a third connection electrode SD1*c*.

The first connection electrode SD1*a* may contact the drain region DR of the active pattern AP through a contact hole formed in the first gate insulating layer GI1, the second gate insulating layer GI2, and the first interlayer insulating layer ILD1. The first connection electrode SD1*a* may transmit the driving current IDR from the active pattern AP to the light emitting diode LD.

The second connection electrode SD1*b* may contact the second gate electrode GE2 through a contact hole formed in the first interlayer insulating layer ILD1. The data power DATA may be transmitted to the second gate electrode GE2 through the second connection electrode SD1*b*.

The third connection electrode SD1*c* may contact the source region SR of the active pattern AP through a contact hole formed in the first gate insulating layer GI1, the second gate insulating layer GI2, and the first interlayer insulating layer ILD1. The first power ELVDD may be transmitted to the source region SR through the third connection electrode SD1*c*.

The second interlayer insulating layer ILD2 may cover the first conductive layer SD1, and may be located on the first interlayer insulating layer ILD1. The second interlayer insulating layer ILD2 may include an insulating material. For example, the insulating material constituting the second interlayer insulating layer ILD2 may be silicon oxide, silicon nitride, silicon oxynitride, aluminum oxide, and the like.

The second conductive layer SD2 may be located on the second interlayer insulating layer ILD2. The second conductive layer SD2 may include a fourth connection electrode SD2*a*, a data power electrode SD2*b*, and a first power electrode SD2*c*. The data power electrode SD2*b* may correspond to the data line DL of FIG. 1. The first power electrode SD2*c* may correspond to the first power line VL1 of FIG. 1.

The fourth connection electrode SD2*a* may contact the first connection electrode SD1*a* through a contact hole formed in the second interlayer insulating layer ILD2. The fourth connection electrode SD2*a* may transmit the driving current IDR from the active pattern AP and the first connection electrode SD1*a* to the light emitting diode LD.

The data power electrode SD2*b* may contact the second connection electrode SD1*b* through a contact hole formed in the second interlayer insulating layer ILD2. The data power DATA may be transmitted to the second gate electrode GE2 through the data power electrode SD2*b* and the second connection electrode SD1*b*. Accordingly, the data power electrode SD2*b* may be connected to the capacitor CST by the second connection electrode SD1*b*.

The first power electrode SD2*c* may contact the third connection electrode SD1*c* through a contact hole formed in the second interlayer insulating layer ILD2. The first power ELVDD may be transmitted to the source region SR through the first power electrode SD2*c* and the third connection electrode SD1*c*.

The via insulating layer VIA may cover the second conductive layer SD2, and may be located on the second interlayer insulating layer ILD2. The via insulating layer VIA may include an organic insulating material. For example, the via insulating layer VIA may include a photoresist, a polyacrylic resin, a polyimide resin, an acrylic resin, and the like.

The first electrode E1 may be located on the via insulating layer VIA. The first electrode E1 may have reflective or transmissive properties. For example, the first electrode E1 may include a metal. The first electrode E1 may contact the fourth connection electrode SD2*a* through a contact hole formed in the via insulating layer VIA. Through this, the first electrode E1 may be connected to the drain region DR of the active pattern AP. That is, the first electrode E1 may be connected to the transistor T1.

The pixel defining layer PDL may be located on the via insulating layer VIA, and an opening exposing a top surface of the first electrode E1 may be defined in the pixel defining layer PDL. For example, the pixel defining layer PDL may include an organic material or an inorganic material.

The light emitting layer EL may be located on the first electrode E1 and the pixel defining layer PDL (e.g., on portions of the pixel defining layer PDL). The light emitting layer EL may generate blue light, red light, or green light, or may generate lights having different colors according to pixels. The light emitting layer EL may have a multilayer structure in which a plurality of layers is stacked.

The second electrode E2 may be located on the light emitting layer EL. The light emitting layer EL may emit light based on a voltage difference between the first electrode E1 and the second electrode E2. Accordingly, the light emitting diode LD including the first electrode E1, the light emitting layer EL, and the second electrode E2 may be located on the substrate SUB.

The pixel PX may include the transistor T1 and the capacitor CST, and may omit a separate switching transistor. Accordingly, an area of the pixel PX may be reduced, and the display device 10 including the pixel PX may have a relatively high pixel per inch (PPI). Accordingly, a display quality of the display device 10 may be improved.

Figure 9:
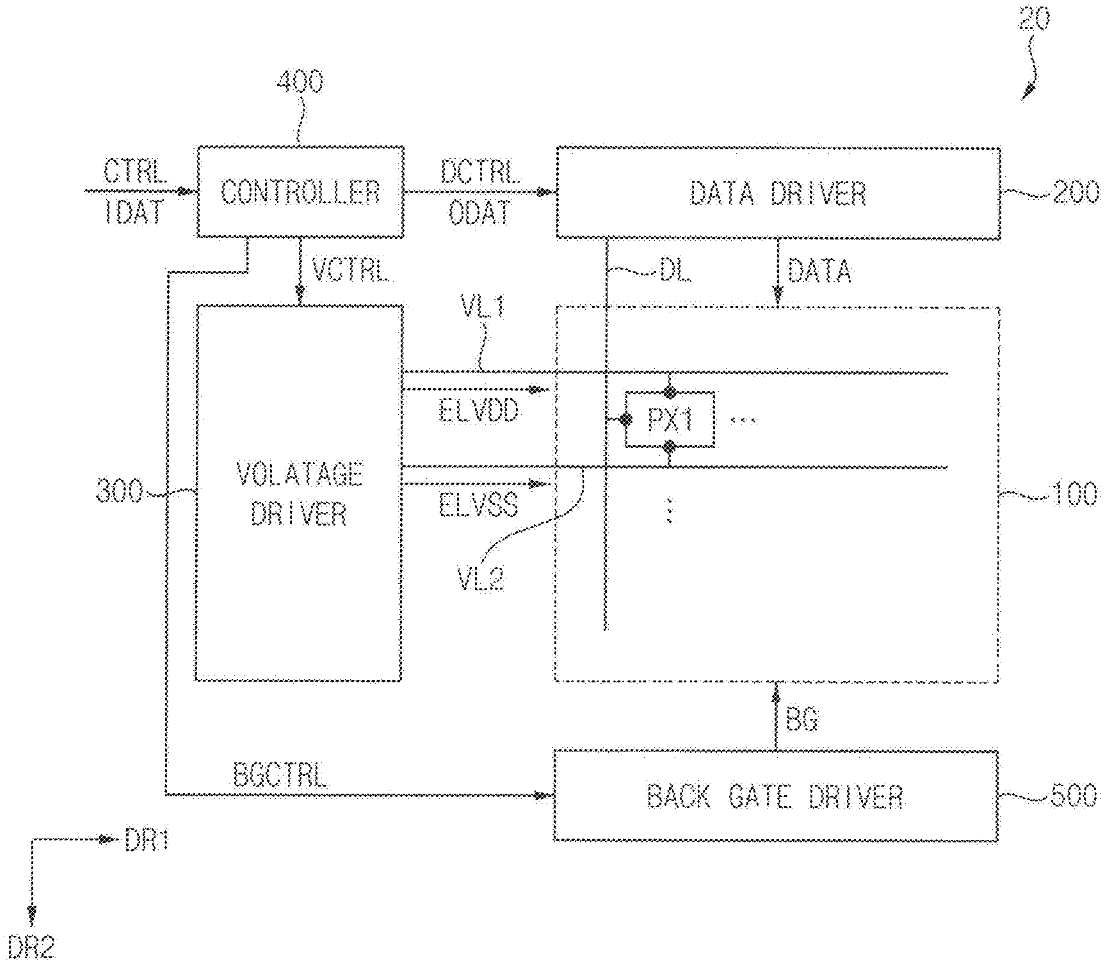
FIG. 9 is a block diagram illustrating a display device according to one or more other embodiments.

FIG. 9 is a block diagram illustrating a display device according to one or more other embodiments.

Referring to FIG. 9, a display device 20 according to one or more other embodiments may include a display panel 100 and a panel driver for driving the display panel 100. The panel driver may include a data driver 200, a power supply (e.g. voltage driver) 300, a controller 400, and a back gate voltage supply 500. However, the display device 20 may be substantially the same as the display device 10 described with reference to FIG. 1, except for the back gate voltage supply 500.

The back gate voltage supply 500 may provide a back gate voltage BG having a voltage level that is periodically changed within the frame period FP based on a back gate voltage control signal BGCTRL. For example, the back gate voltage supply 500 may output the back gate voltage BG to a pixel PX1 through a back gate voltage line. In one or more embodiments, the back gate voltage supply 500 may be mounted on the display panel 100 or may be integrated in a peripheral portion of the display panel 100. In one or more other embodiments, the back gate voltage supply 500 may be implemented with one or more integrated circuits (ICs).

Figure 10:
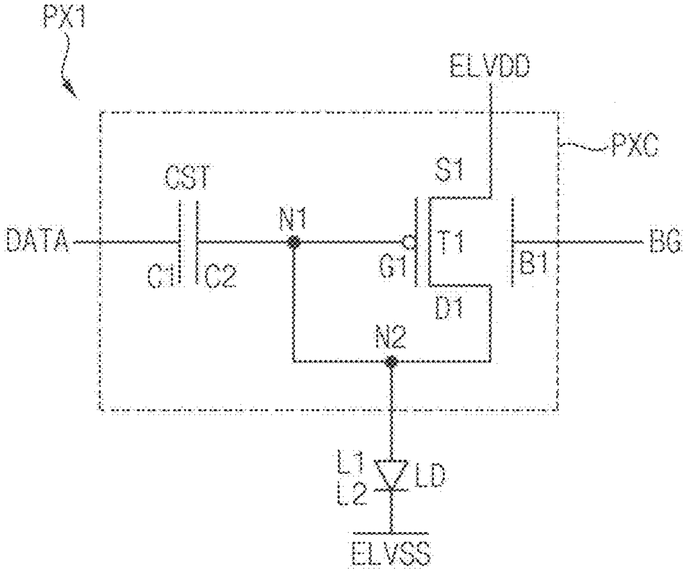
FIG. 10 is a circuit diagram for describing a pixel included in the display device of FIG. 9.

FIG. 10 is a circuit diagram for describing a pixel included in the display device of FIG. 9.

Referring to FIGS. 9 and 10, the pixel PX1 may include a pixel circuit PXC and a light emitting diode LD. The pixel PX1 may be driven through the pixel circuit PXC. In one or more embodiments, the pixel PX1 may include a transistor T1 and a capacitor CST. The pixel PX1 illustrated in FIG. 10 may be substantially the same as the pixel PX illustrated in FIG. 2, except that the transistor T1 includes a back gate terminal B1.

In one or more embodiments, the transistor T1 may include a gate terminal G1 connected to a first node N1, a first terminal S1 connected to the first power ELVDD, a second terminal D1 connected to a second node N2, and a back gate terminal B1. The second node N2 may have the same potential as the first node N1. The transistor T1 may have a double gate structure including the gate terminal G1 and the back gate terminal B1. The back gate terminal B1 may receive the back gate voltage BG.

Figure 11:
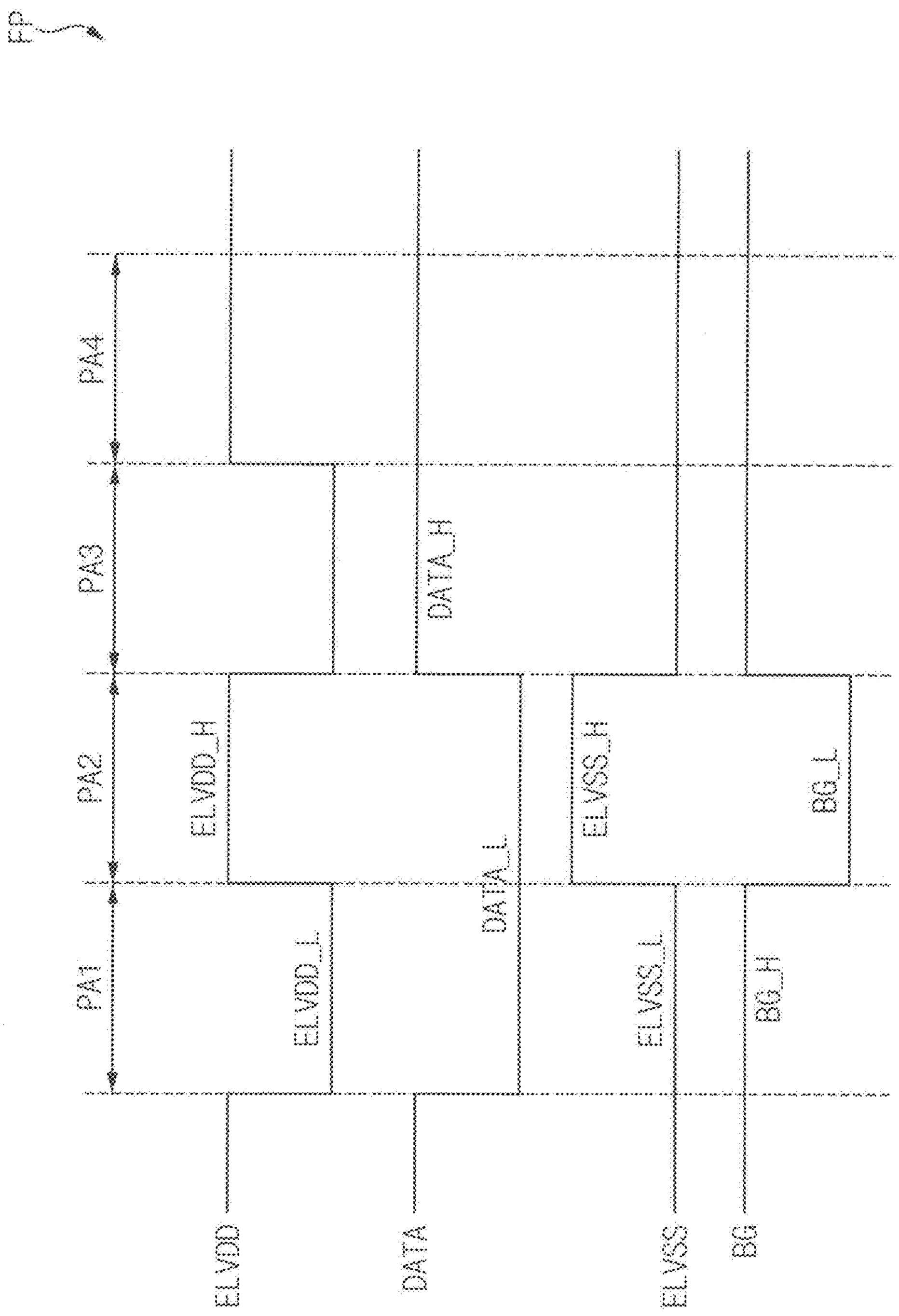
FIG. 11 is a timing diagram for describing an operation of the pixel of FIG. 10.

FIG. 11 is a timing diagram for describing an operation of the pixel of FIG. 10.

Referring to FIGS. 10 and 11, the frame period FP for the pixel PX1 may sequentially include an initialization period PA1 which the gate terminal G1 of the transistor T1 is initialized, a compensation period PA2 which a threshold voltage of the transistor T1 is compensated, a data writing period PA3 which the data power DATA is applied, and a light emitting period PA4 which the pixel PX1 emits light. The frame period FP shown in FIG. 11 may be substantially the same as the frame period FP shown in FIG. 3, except that the back gate voltage BG is applied to the back gate terminal B1 of the transistor T1.

In one or more embodiments, the pixel PX1 may be connected to the back gate voltage BG having a voltage level that is periodically changed within the frame period FP. For example, the back gate voltage BG may have a seventh voltage level BG_L, and an eighth voltage level BG_H that is greater than the seventh voltage level BG_L.

Figure 12:
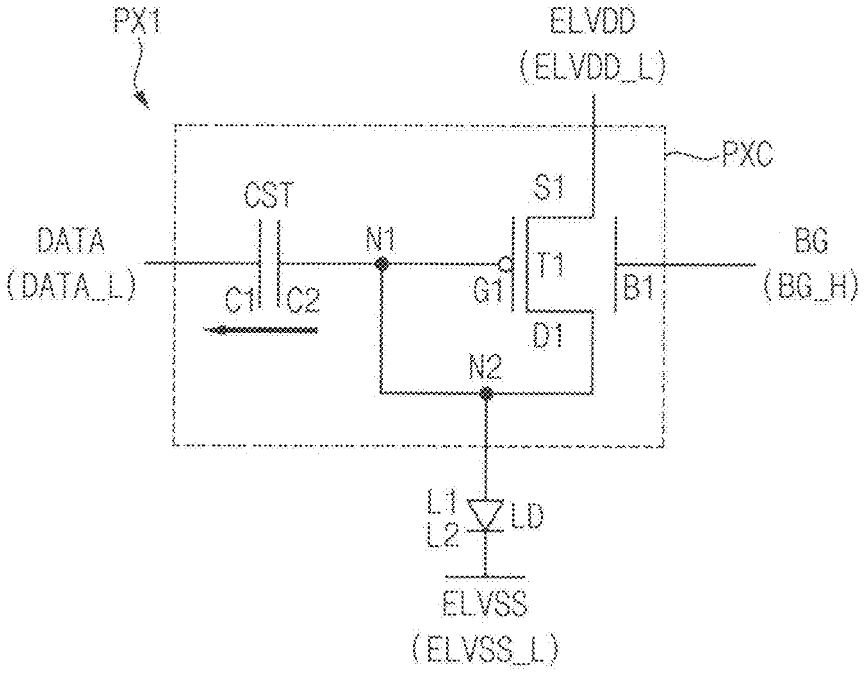
FIGS. 12, 13, 14, and 15 are circuit diagrams for describing an operation of the pixel of FIG. 10.
Figure 13:
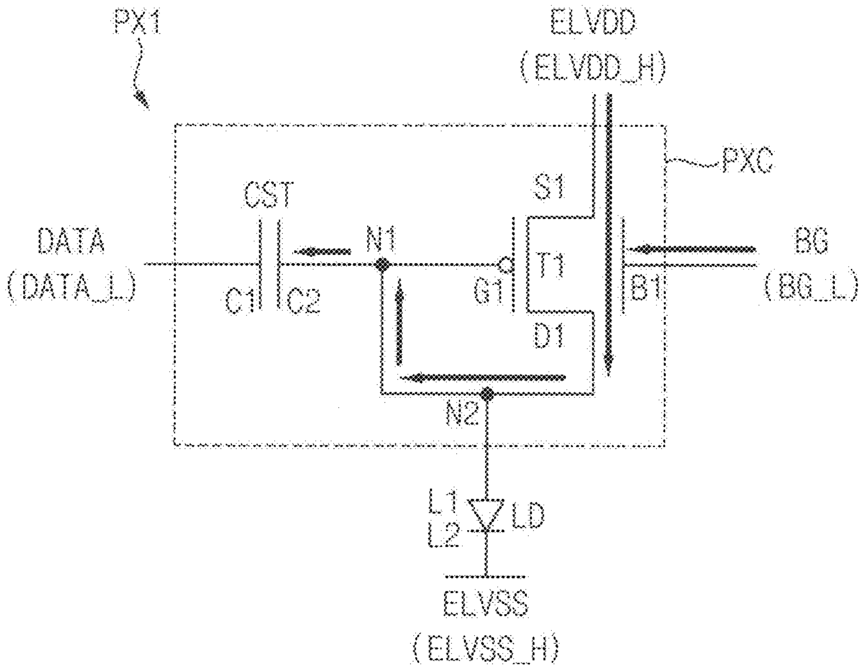
Figure 14:
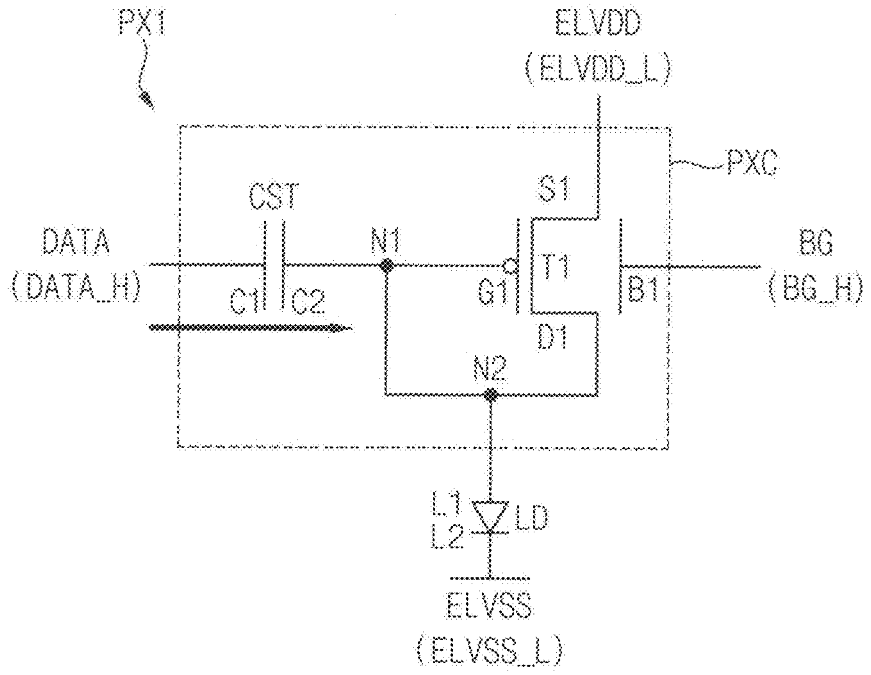
Figure 15:
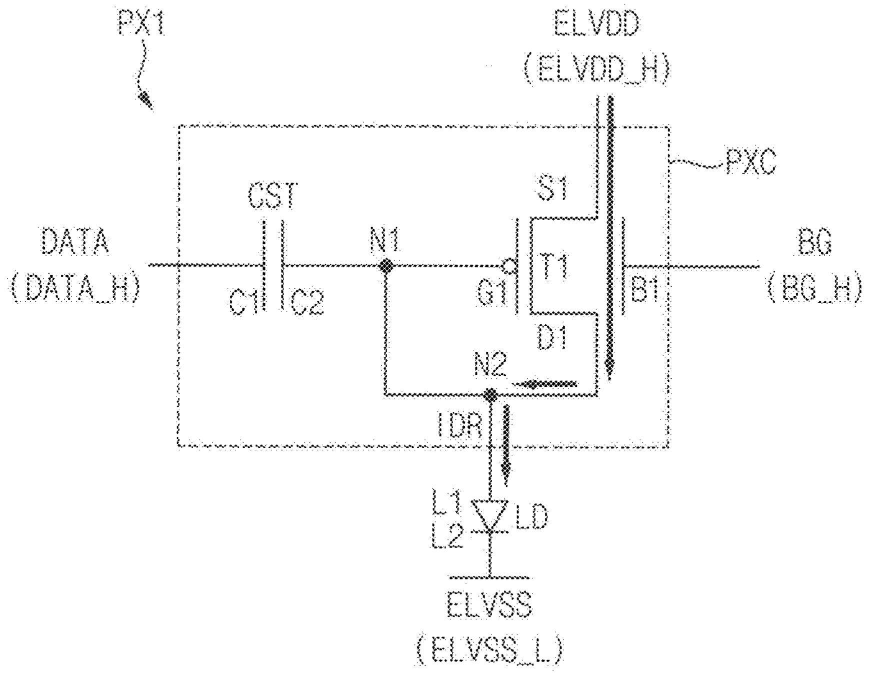

FIGS. 12, 13, 14, and 15 are circuit diagrams for describing an operation of the pixel of FIG. 10. For example, FIG. 12 is a circuit diagram for describing an operation of the pixel in the initialization period, FIG. 13 is a circuit diagram for describing an operation of the pixel in the compensation period, FIG. 14 is a circuit diagram for describing an operation of the pixel in the data writing period, and FIG. 15 is a circuit diagram for describing an operation of the pixel in the light emitting period. An operation of the pixel PX1 shown in FIGS. 12 to 15 may be substantially the same as an operation of the pixel PX shown in FIGS. 4 to 7, except that the back gate voltage BG is applied to the back gate terminal B1 of the transistor T1.

Referring to FIGS. 11 and 12, in the initialization period PA1, the first power ELVDD may have the first voltage level ELVDD_L, the data power DATA may have the third voltage level DATA_L, the second power ELVSS may have the fifth voltage level ELVSS_L, and the back gate voltage BG may have the eighth voltage level BG_H. Accordingly, a voltage of the gate terminal G1 of the transistor T1 may be initialized. For example, each of the first voltage level ELVDD_L, the third voltage level DATA_L and the fifth voltage level ELVSS_L may be about −3V, and the eighth voltage level BG_H may be about 7V, but the present disclosure is not limited thereto.

Referring to FIGS. 11 and 13, in the compensation period PA2, the first power ELVDD may have the second voltage level ELVDD_H, the data power DATA may have the third voltage level DATA_L, the second power ELVSS may have the sixth voltage level ELVSS_H, and the back gate voltage BG may have the seventh voltage level BG_L. In one or more embodiments, when the back gate terminal B1 receives the seventh voltage level BG_L, a driving range of the transistor T1 may increase. Accordingly, a threshold voltage of the transistor T1 may be compensated. For example, each of the second voltage level ELVDD_H and the sixth voltage level ELVSS_H may be about 4V, the third voltage level DATA_L may be about −3V, and the seventh voltage level BG_L may be about −7V, but the present disclosure is not limited thereto.

Referring to FIGS. 11 and 14, in the data writing period PA3, the first power ELVDD may have the first voltage level ELVDD_L, the data power DATA may have the fourth voltage level DATA_H, the second power ELVSS may have the fifth voltage level ELVSS_L, and the back gate voltage BG may have the eighth voltage level BG_H. Accordingly, the data power DATA may apply the fourth voltage level DATA_H to the first node N1. For example, each of the first voltage level ELVDD_L and the fifth voltage level ELVSS_L may be about −3V, the fourth voltage level DATA_H may be about 4V, and the eighth voltage level BG_H may be about 7V, but the present disclosure is not limited thereto.

Referring to FIGS. 11 and 15, in the light emitting period PA4, the first power ELVDD may have the second voltage level ELVDD_H, the data power DATA may have the fourth voltage level DATA_H, the second power ELVSS may have the fifth voltage level ELVSS_L, and the back gate voltage BG may have the eighth voltage level BG_H. Accordingly, the transistor T1 may generate the driving current IDR based on a voltage of the first node N1 (ELVDD_H−Vth+DATA_H), and may provide the driving current IDR to the light emitting diode LD. The light emitting diode LD may emit light based on the driving current IDR. For example, each of the second voltage level ELVDD_H and the fourth voltage level DATA_H may be about 4V, the fifth voltage level ELVSS_L may be about −3V, and the eighth voltage level BG_H may be about 7V, but the present disclosure is not limited thereto.

Figure 16:
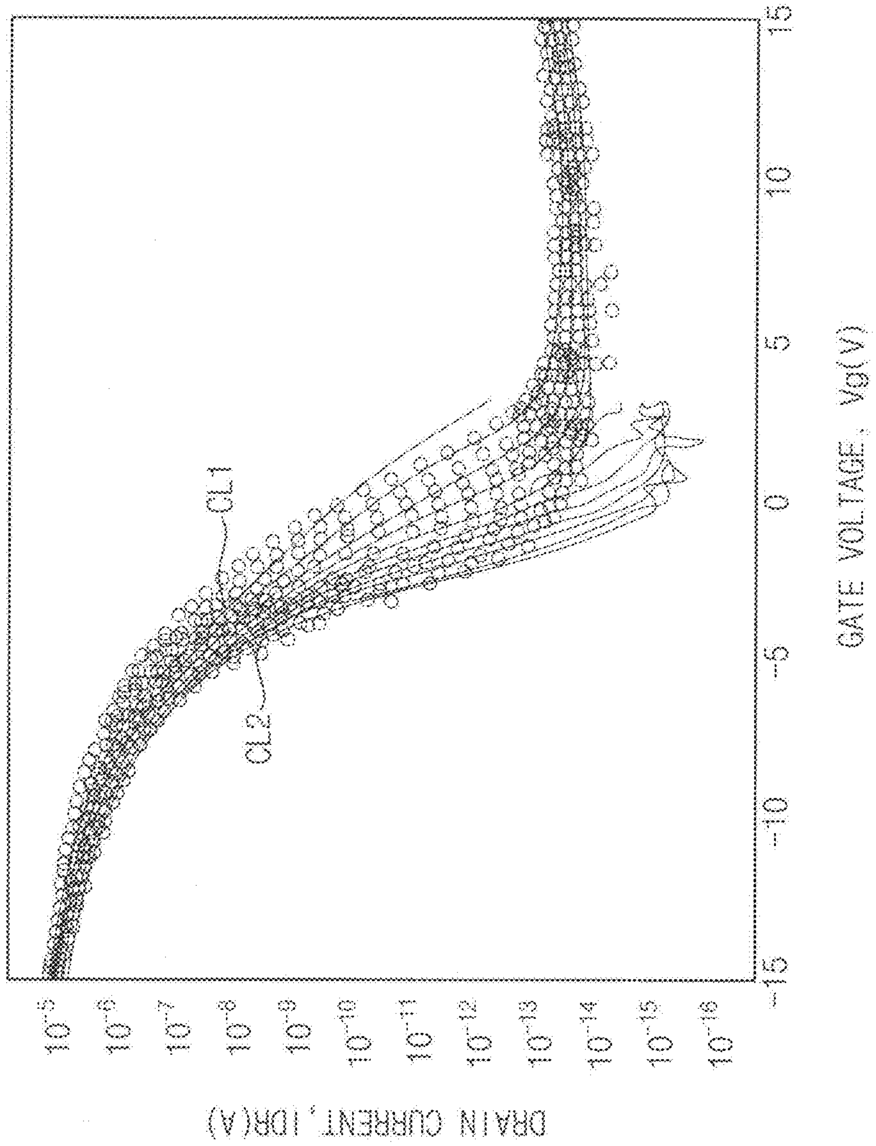
FIG. 16 is a graph for explaining a change in a driving range of a transistor according to a back gate voltage applied to a back gate terminal of the transistor.

FIG. 16 is a graph for explaining a change in a driving range of a transistor according to a back gate voltage applied to a back gate terminal of the transistor.

Referring to FIG. 16, a driving range of the transistor T1 may vary according to the back gate voltage BG applied to the back gate terminal B1. In FIG. 16, a first curve CL1 may be a case in which the back gate voltage BG having a positive polarity is applied to the back gate terminal B1, and a second curve CL2 may be a case in which the back gate voltage BG having a negative polarity is applied to the back gate terminal B1. The driving range may be inversely proportional to an absolute value of a slope of a curve (hereinafter, an I-V curve) representing a relationship between the driving current IDR and the gate voltage Vg of the transistor T1.

As shown in FIG. 16, when the back gate voltage BG having the positive polarity is applied to the back gate terminal B1, the absolute value of the slope of the I-V curve of the transistor T1 (e.g., the first curve CL1) may increase, and the driving range of the transistor T1 may decrease. In addition, when the back gate voltage BG having the negative polarity is applied to the back gate terminal B1, the absolute value of the slope of the I-V curve of the transistor T1 (e.g., the second curve CL2) may decrease, and the driving range of the transistor T1 may increase. It may be suitable that the driving range of the transistor T1 is relatively wide to reduce a time length of the compensation period PA2, and to increase an efficiency of threshold voltage compensation. Accordingly, during the compensation period PA2, the back gate voltage BG having the negative polarity may be applied to the back gate terminal B1.

Figure 17:
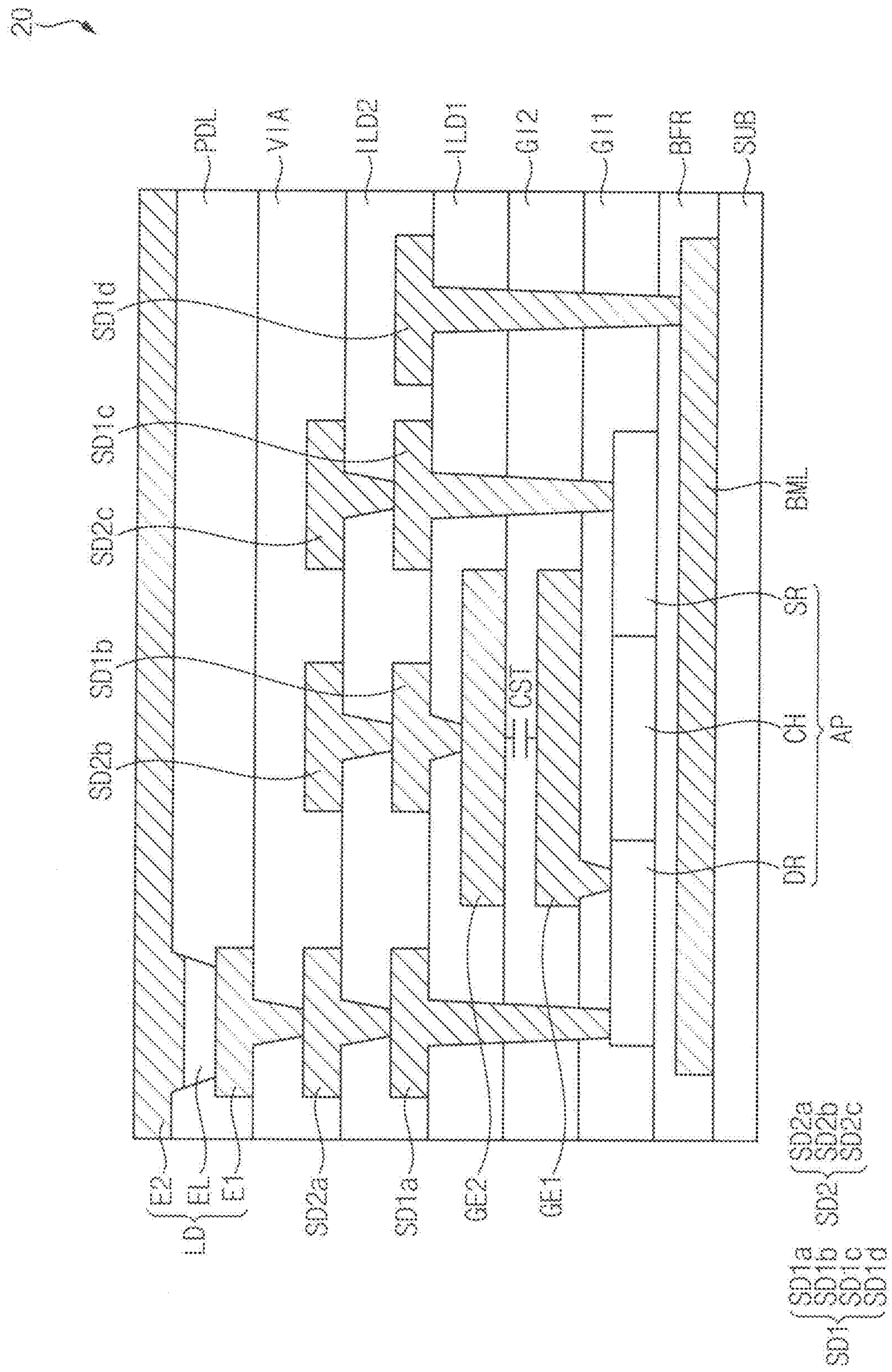
FIG. 17 is a cross-sectional view for describing the display device of FIG. 9.

FIG. 17 is a cross-sectional view for describing the display device of FIG. 9.

Referring to FIG. 17, the display device 20 may include a substrate SUB, a back gate pattern BML, a buffer layer BFR, an active pattern AP, a first gate insulating layer GI1, a first gate electrode GE1, a second gate insulating layer GI2, a second gate electrode GE2, a first interlayer insulating layer ILD1, a first conductive layer SD1, a second interlayer insulating layer ILD2, a second conductive layer SD2, a via insulating layer VIA, a first electrode E1, a pixel defining layer PDL, an light emitting layer EL, and a second electrode E2. The display device 20 may be substantially the same as the display device 10 described with reference to FIG. 8, except for the back gate pattern BML and a back gate voltage electrode SD1*d* included in the second conductive layer SD2.

Referring to FIG. 17, the back gate pattern BML may be located between the substrate SUB and the active pattern AP. In one or more embodiments, the back gate pattern BML may include a metal. For example, the back gate pattern BML may include the same metal as that of the first gate electrode GE1.

In one or more other embodiments, the back gate pattern BML may include a silicon semiconductor. For example, the back gate pattern BML may include amorphous silicon or polycrystalline silicon. In addition, the back gate pattern BML may be doped with a cation or an anion. For example, the cation may be a group III element, and may be boron and the like. The anion may be a group V element, and may be phosphorus and the like.

In one or more embodiments, the back gate voltage BG may be provided to the back gate pattern BML.

The first conductive layer SD1 may be located on the first interlayer insulating layer ILD1. The first conductive layer SD1 may include a first connection electrode SD1*a*, a second connection electrode SD1*b*, a third connection electrode SD1*c*, and a back gate voltage electrode SD1*d*. However, the first conductive layer SD1 shown in FIG. 17 may be substantially the same as the first conductive layer SD1 described with reference to FIG. 8 except for the back gate voltage electrode SD1*d*.

The back gate voltage electrode SD1*d* may contact back gate pattern BML through a contact hole formed in the buffer layer BFR, the first gate insulating layer GI1, the second gate insulating layer GI2, and the first interlayer insulating layer ILD1. The back gate voltage BG may be transmitted to the back gate pattern BML through the back gate voltage electrode SD1*d*.

The pixel PX1 may be implemented with a simple 1T1C structure including the transistor T1 including the back gate terminal B1 and the capacitor CST. During the compensation period PA2, the back gate voltage BG having a negative polarity may be applied to the back gate terminal B1. Accordingly, a driving range of the transistor T1 may increase, and a time length of the compensation period PA2 may decrease. Accordingly, a display quality of the display device 20 may be improved.

Figure 18:
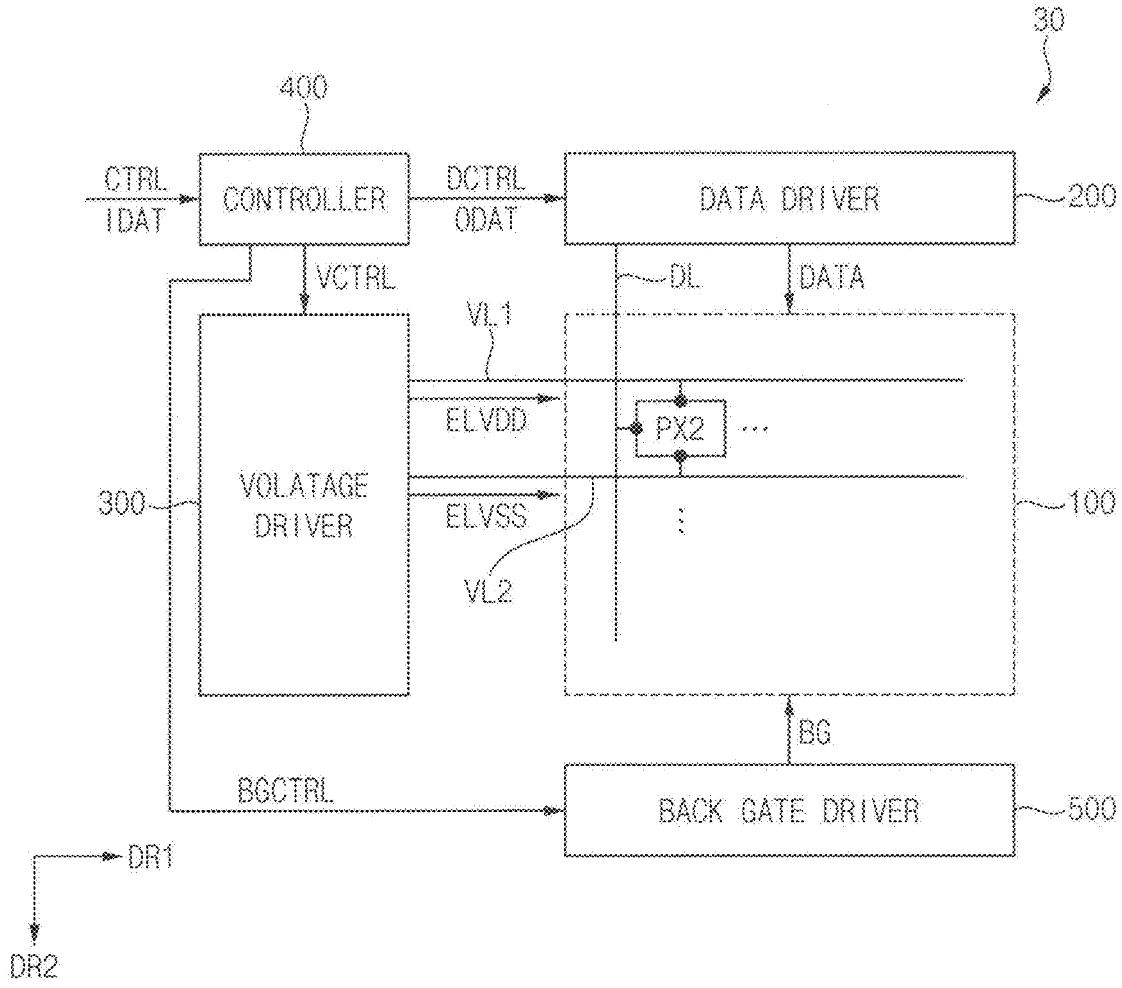
FIG. 18 is a block diagram illustrating a display device according to still one or more other embodiments.

FIG. 18 is a block diagram illustrating a display device according to still one or more other embodiments.

Referring to FIG. 18, a display device 30 according to still one or more other embodiments may include a display panel 100, and a panel driver for driving the display panel 100. The panel driver may include a data driver 200, a power supply (e.g. voltage driver) 300, a controller 400, and a back gate voltage supply 500.

Figure 19:
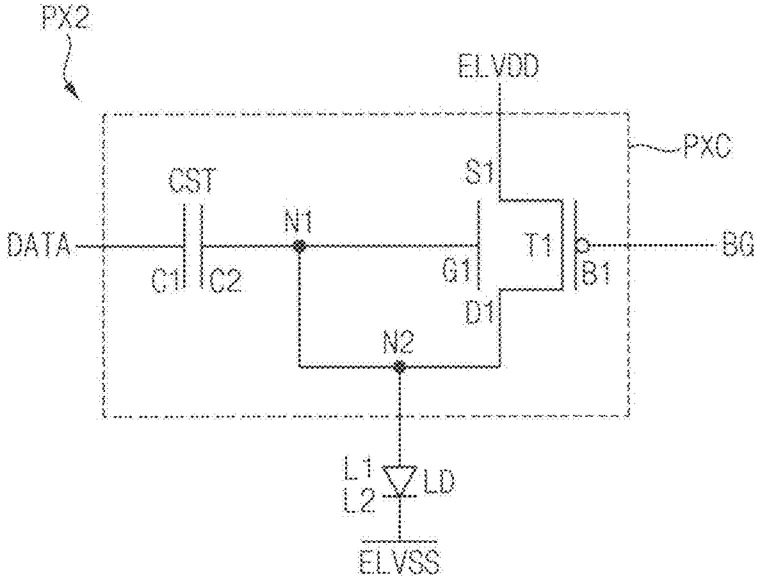
FIG. 19 is a circuit diagram for describing a pixel included in the display device of FIG. 18.
Figure 20:
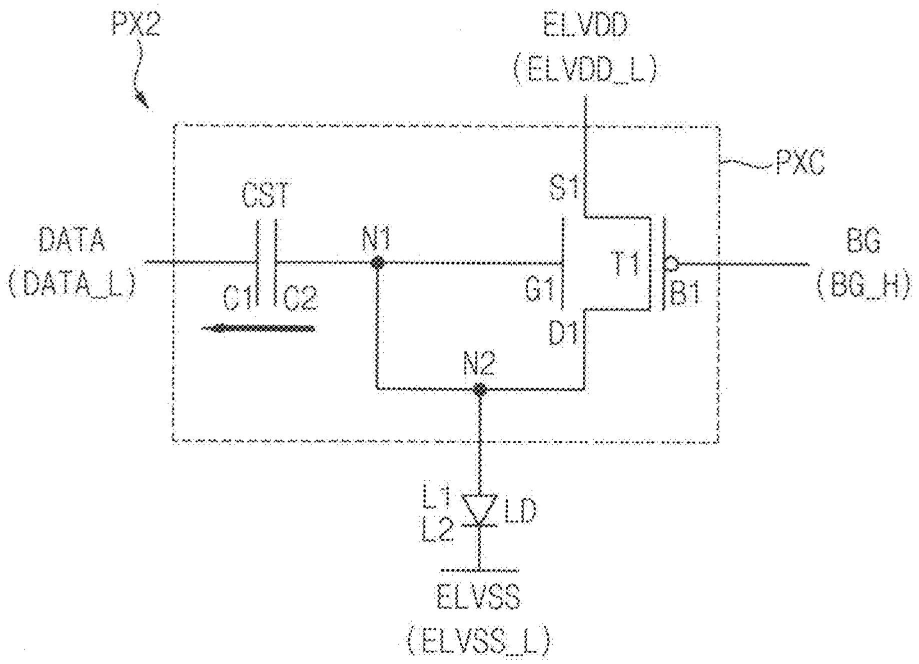
FIGS. 20, 21, 22, and 23 are circuit diagrams for describing an operation of the pixel of FIG. 19.
Figure 21:
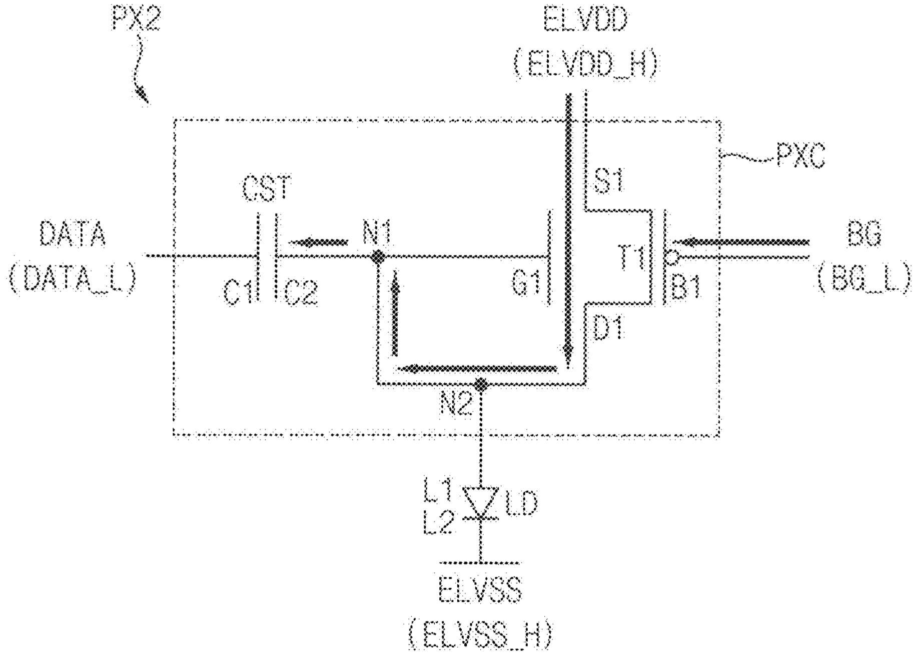
Figure 22:
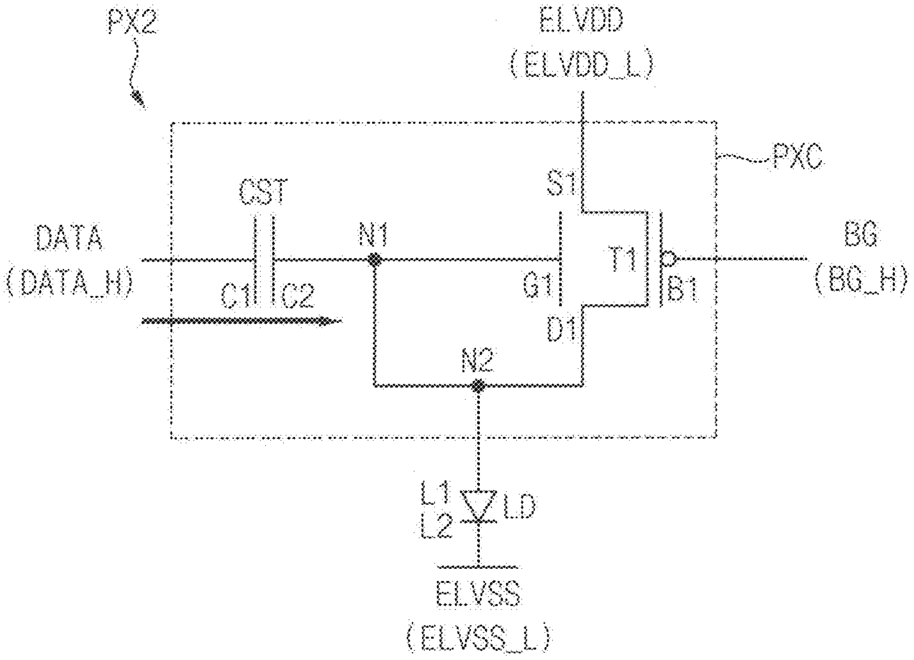
Figure 23:
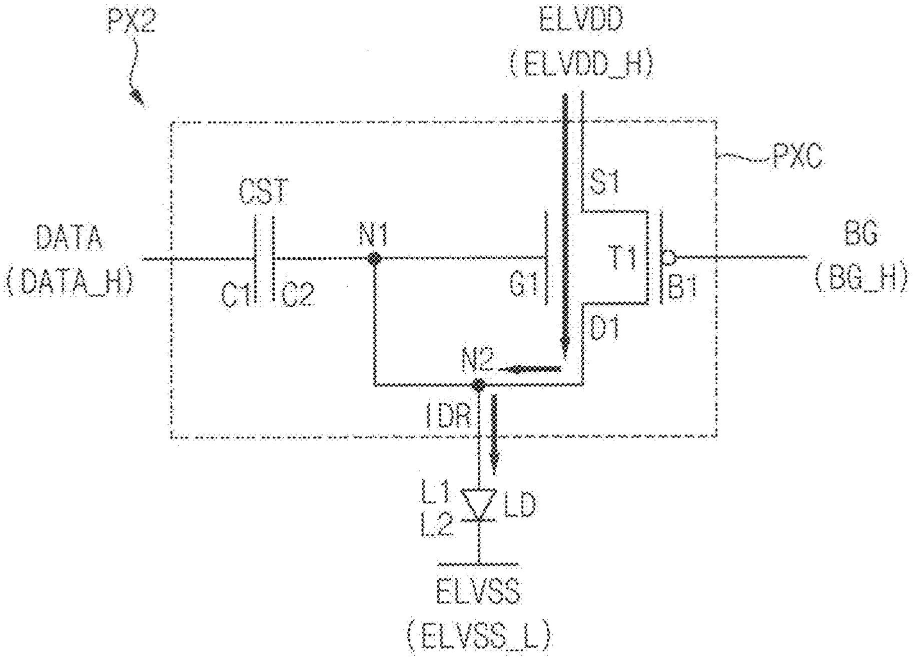

FIG. 19 is a circuit diagram for describing a pixel included in the display device of FIG. 18. FIGS. 20, 21, 22, and 23 are circuit diagrams for describing an operation of the pixel of FIG. 19. For example, FIG. 20 is a circuit diagram for describing an operation of the pixel in the initialization period, FIG. 21 is a circuit diagram for describing an operation of the pixel in the compensation period, FIG. 22 is a circuit diagram for describing an operation of the pixel in the data writing period, and FIG. 23 is a circuit diagram for describing an operation of the pixel in the light emitting period.

Referring to FIG. 19, a pixel PX2 may include a pixel circuit PXC and a light emitting diode LD. The pixel PX2 may be driven through the pixel circuit PXC. In one or more embodiments, the pixel PX2 may include a transistor T1 and a capacitor CST.

In one or more embodiments, the transistor T1 may include a gate terminal G1 connected to a first node N1, a first terminal S1 connected to the first power ELVDD, a second terminal D1 connected to a second node N2, and a back gate terminal B1. The second node N2 may have the same potential as the first node N1. The transistor T1 may have a double gate structure including the gate terminal G1 and the back gate terminal B1. The back gate terminal B1 may receive a back gate voltage BG.

Figure 24:
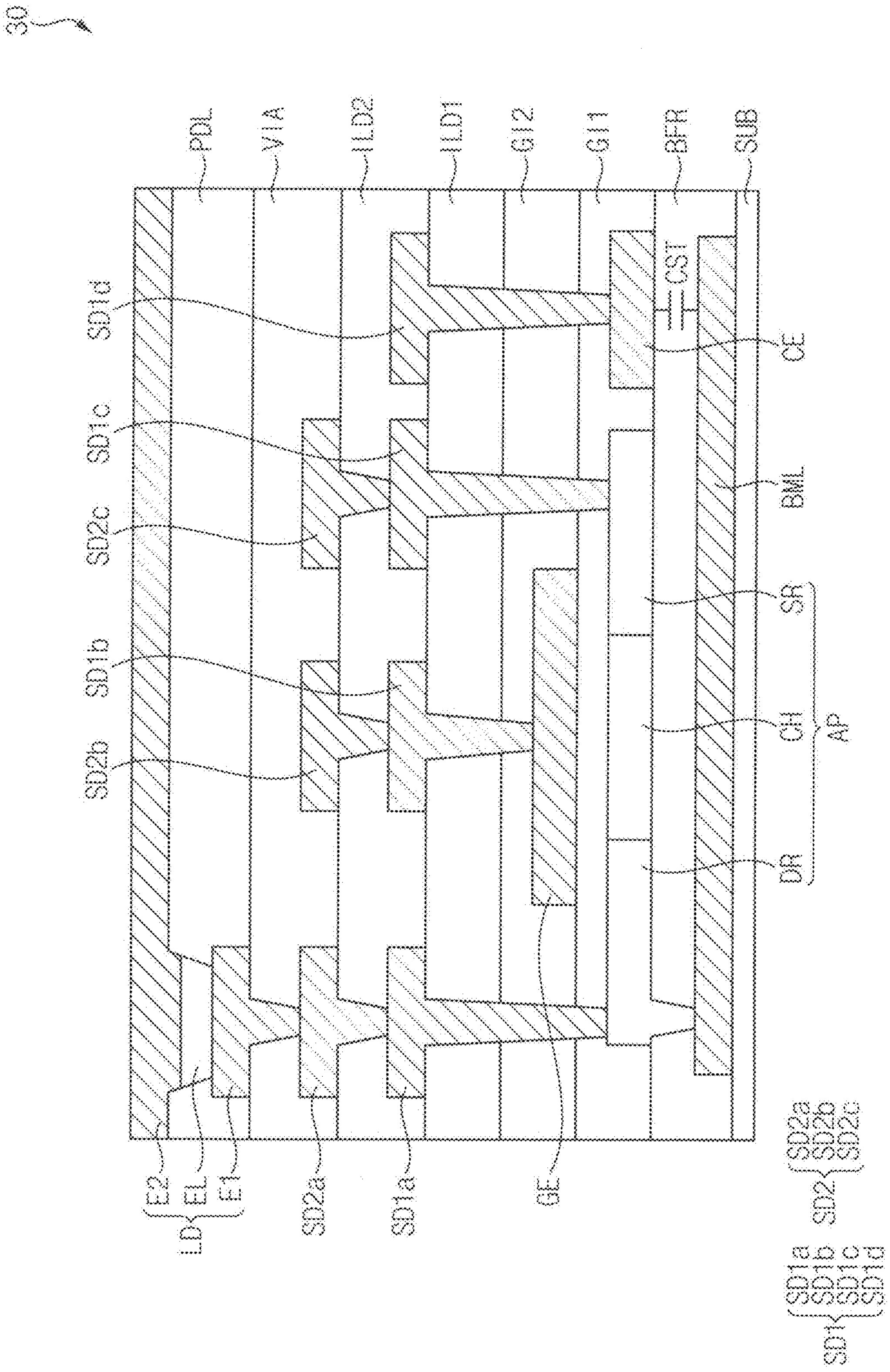
FIG. 24 is a cross-sectional view for describing an example of the display device of FIG. 18.

FIG. 24 is a cross-sectional view for describing an example of the display device of FIG. 18.

Referring to FIG. 24, the display device 30 may include a substrate SUB, a back gate pattern BML, a buffer layer BFR, an active pattern AP, a capacitor electrode CE, a first gate insulating layer GI1, a gate electrode GE, a second gate insulating layer GI2, a first interlayer insulating layer ILD1, a first conductive layer SD1, a second interlayer insulating layer ILD2, a second conductive layer SD2, a via insulating layer VIA, a first electrode E1, a pixel defining layer PDL, an light emitting layer EL, and a second electrode E2.

The substrate SUB may be a transparent insulating substrate including glass, quartz, plastic, and the like. In one or more embodiments, the substrate SUB may include a first plastic layer, a first barrier layer located on the first plastic layer, a second plastic layer located on the first barrier layer, and a second barrier layer located on the second plastic layer. The first plastic layer and the second plastic layer may include an organic insulating material, such as polyimide and the like. The first barrier layer and the second barrier layer may include an inorganic insulating material, such as silicon oxide, silicon nitride, amorphous silicon, and the like.

The back gate pattern BML may be located on the substrate SUB. In one or more embodiments, the back gate pattern BML may include a metal. For example, the back gate pattern BML may include the same metal as that of the first gate electrode GE1. In one or more other embodiments, the back gate pattern BML may include a silicon semiconductor. For example, the back gate pattern BML may include amorphous silicon or polycrystalline silicon. In addition, the back gate pattern BML may be doped with a cation or an anion. For example, the cation may be a group III element, and may be boron and the like. The anion may be a group V element, and may be phosphorus and the like.

The buffer layer BFR may be located on the substrate SUB. The buffer layer BFR may reduce or prevent metal atoms or impurities diffusing into the active pattern AP. In addition, the buffer layer BFR may control a heat supply rate during a crystallization process for forming the active pattern AP. The material constituting the buffer layer BFR may be silicon oxide, silicon nitride, silicon oxynitride, and the like. The above substances may be used alone or in combination. The buffer layer BFR may have a single-layer or multi-layer structure.

The active pattern AP may be located on the buffer layer BFR. The active pattern AP may include a source region SR, a drain region DR, and a channel region CH. For example, the active pattern AP may include the source region SR, the drain region DR, and a channel region CH formed between the source region SR and the drain region DR. The source region SR and the drain region DR may serve as the first terminal S1 and the second terminal D1 of the transistor T1, respectively. The drain region DR may contact the back gate pattern BML through a contact hole formed in the buffer layer BFR.

The capacitor electrode CE may be located on the buffer layer BFR. In one or more embodiments, the capacitor electrode CE may constitute the capacitor CST together with the back gate pattern BML. For example, the capacitor electrode CE may overlap the back gate pattern BML, and the data power DATA may be provided to the capacitor electrode CE.

The first gate insulating layer GI1 may cover the active pattern AP and the capacitor electrode CE, and may be located on the buffer layer BFR. The first gate insulating layer GI1 may include an insulating material. For example, the first gate insulating layer GI1 may include silicon oxide, silicon nitride, silicon oxynitride, and the like. The above substances may be used alone or in combination. The first gate insulating layer GI1 may have a single-layer or multi-layer structure.

The gate electrode GE may be located on the first gate insulating layer GI1. The gate electrode GE may be located in an island shape. The gate electrode GE may constitute the transistor T1 together with the active pattern AP. For example, the gate electrode GE may correspond to the back gate terminal B1 of the transistor T1 described with reference to FIG. 19. The gate electrode GE may include a metal, an alloy, a conductive metal oxide, a transparent conductive material, and the like.

The second gate insulating layer GI2 may cover the gate electrode GE, and may be located on the first gate insulating layer GI1. The second gate insulating layer GI2 may include an insulating material. For example, the second gate insulating layer GI2 may include silicon oxide, silicon nitride, silicon oxynitride, and the like. The above substances may be used alone or in combination. The second gate insulating layer GI2 may have a single-layer or multi-layer structure.

The first interlayer insulating layer ILD1 may be located on the second gate insulating layer GI2. The first interlayer insulating layer ILD1 may include an insulating material. For example, the insulating material constituting the first interlayer insulating layer ILD1 may be silicon oxide, silicon nitride, silicon oxynitride, aluminum oxide, and the like. The above substances may be used alone or in combination.

The first conductive layer SD1 may be located on the first interlayer insulating layer ILD1. The first conductive layer SD1 may include a first connection electrode SD1*a*, a second connection electrode SD1*b*, a third connection electrode SD1*c*, and a data power electrode SD1*d*. The data power electrode SD1*d* may correspond to the data line DL of FIG. 18.

The first connection electrode SD1*a* may contact the drain region DR of the active pattern AP through a contact hole formed in the first gate insulating layer GI1, the second gate insulating layer GI2, and the first interlayer insulating layer ILD1. The first connection electrode SD1*a* may transmit the driving current IDR from the active pattern AP to the light emitting diode LD.

The second connection electrode SD1*b* may contact the gate electrode GE through a contact hole formed in the second gate insulating layer GI2 and the first interlayer insulating layer ILD1. The back gate voltage BG may be transmitted to the gate electrode GE through the second connection electrode SD1*b*.

The third connection electrode SD1*c* may contact the source region SR of the active pattern AP through a contact hole formed in the first gate insulating layer GI1, the second gate insulating layer GI2, and the first interlayer insulating layer ILD1. The first power ELVDD may be transmitted to the source region SR through the third connection electrode SD1*c*.

The data power electrode SD1*d* may contact the capacitor electrode CE through a contact hole formed in the first gate insulating layer GI1, the second gate insulating layer GI2, and the first interlayer insulating layer ILD1. The data power DATA may be transmitted to the capacitor electrode CE through the data power electrode SD1*d*.

The second interlayer insulating layer ILD2 may cover the first conductive layer SD1, and may be located on the first interlayer insulating layer ILD1. The second interlayer insulating layer ILD2 may include an insulating material. For example, the insulating material constituting the second interlayer insulating layer ILD2 may be silicon oxide, silicon nitride, silicon oxynitride, aluminum oxide, and the like.

The second conductive layer SD2 may be located on the second interlayer insulating layer ILD2. The second conductive layer SD2 may include a fourth connection electrode SD2*a*, a back gate voltage electrode SD2*b*, and a first power electrode SD2*c*. The first power electrode SD2*c* may correspond to the first power line VL1 of FIG. 18.

The fourth connection electrode SD2*a* may contact the first connection electrode SD1*a* through a contact hole formed in the second interlayer insulating layer ILD2. The fourth connection electrode SD2*a* may transmit the driving current IDR from the active pattern AP and the first connection electrode SD1*a* to the light emitting diode LD.

The back gate voltage electrode SD2*b* may contact the second connection electrode SD1*b* through a contact hole formed in the second interlayer insulating layer ILD2. The back gate voltage BG may be transmitted to the gate electrode GE through the back gate voltage electrode SD2*b* and the second connection electrode SD1*b*.

The first power electrode SD2*c* may contact the third connection electrode SD1*c* through a contact hole formed in the second interlayer insulating layer ILD2. The first power ELVDD may be transmitted to the source region SR through the first power electrode SD2*c* and the third connection electrode SD1*c*.

The via insulating layer VIA may cover the second conductive layer SD2, and may be located on the second interlayer insulating layer ILD2. The via insulating layer VIA may include an organic insulating material. For example, the via insulating layer VIA may include a photoresist, a polyacrylic resin, a polyimide resin, an acrylic resin, and the like.

The first electrode E1 may be located on the via insulating layer VIA. The first electrode E1 may have reflective or transmissive properties. For example, the first electrode E1 may include a metal. The first electrode E1 may contact the fourth connection electrode SD2*a* through a contact hole formed in the via insulating layer VIA. Through this, the first electrode E1 may be connected to the drain region DR of the active pattern AP. That is, the first electrode E1 may be connected to the transistor T1.

The pixel defining layer PDL may be located on the via insulating layer VIA, and an opening exposing a top surface of the first electrode E1 may be defined in the pixel defining layer PDL. For example, the pixel defining layer PDL may include an organic material or an inorganic material.

The light emitting layer EL may be located on the first electrode E1 and the pixel defining layer PDL. The light emitting layer EL may generate blue light, red light, or green light, or may generate lights having different colors according to pixels. The light emitting layer EL may have a multilayer structure in which a plurality of layers is stacked.

The second electrode E2 may be located on the light emitting layer EL. The light emitting layer EL may emit light based on a voltage difference between the first electrode E1 and the second electrode E2. Accordingly, the light emitting diode LD including the first electrode E1, the light emitting layer EL, and the second electrode E2 may be located on the substrate SUB.

Figure 25:
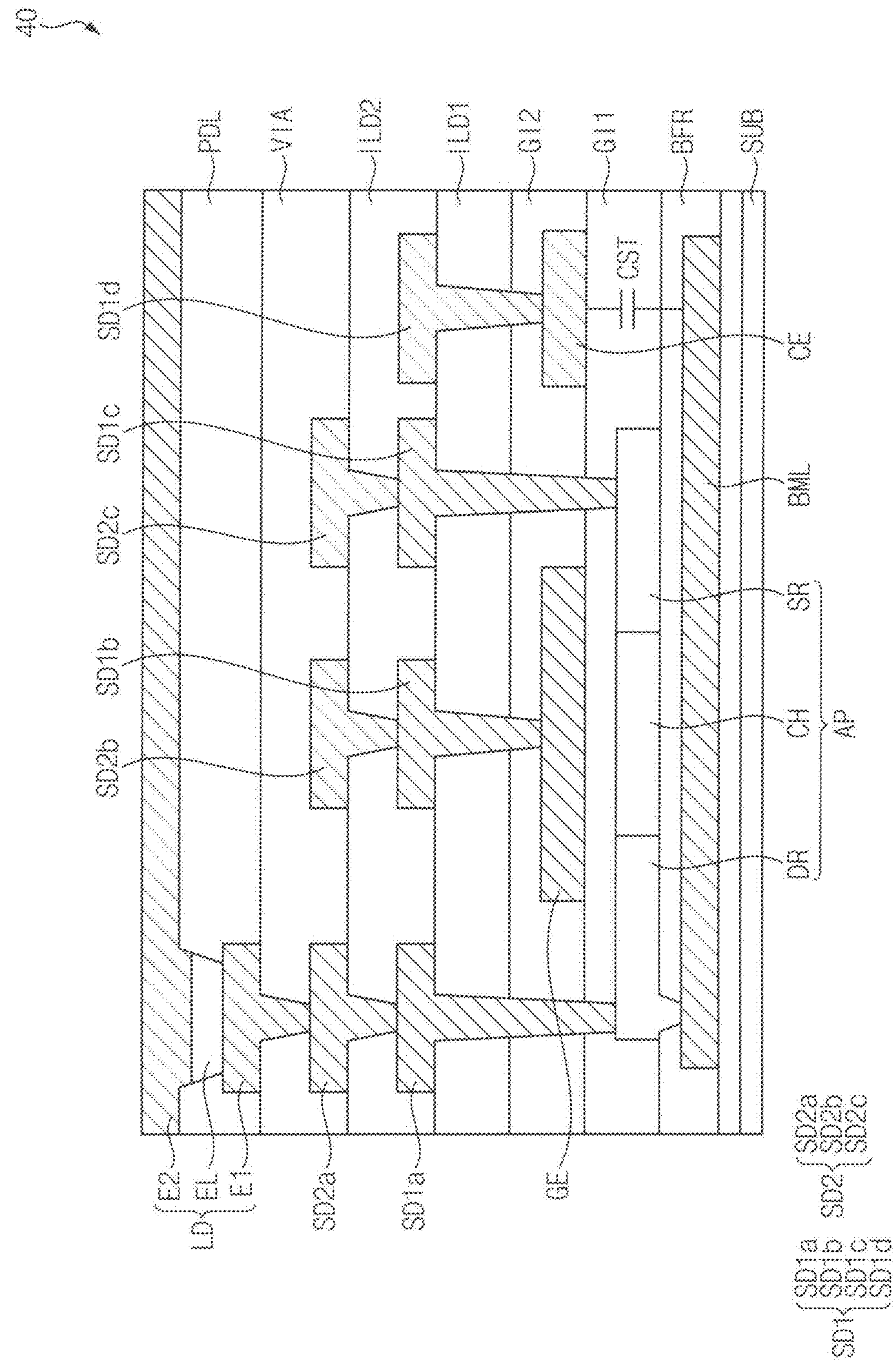
FIG. 25 is a cross-sectional view for describing another example of the display device of FIG. 18.

FIG. 25 is a cross-sectional view for describing another example of the display device of FIG. 18.

Referring to FIG. 25, a display device 40 according to still one or more other embodiments may include a substrate SUB, a back gate pattern BML, a buffer layer BFR, an active pattern AP, a first gate insulating layer GI1, a gate electrode GE, a capacitor electrode CE, a second gate insulating layer GI2, a first interlayer insulating layer ILD1, a first conductive layer SD1, a second interlayer insulating layer ILD2, a second conductive layer SD2, a via insulating layer VIA, a first electrode E1, a pixel defining layer PDL, an light emitting layer EL, and a second electrode E2 However, the display device 40 may be substantially the same as the display device 30 described with reference to FIG. 24, except for the arrangement of the capacitor electrode CE.

As shown in FIG. 25, the capacitor electrode CE may be located on the first gate insulating layer GI1. In one or more embodiments, the capacitor electrode CE may constitute a capacitor CST together with the back gate pattern BML. For example, the capacitor electrode CE may overlap the back gate pattern BML, and the data power DATA may be provided to the capacitor electrode CE.

The present disclosure can be applied to various display devices. For example, the present disclosure is applicable to various display devices, such as display devices for vehicles, ships, and aircraft, such as portable communication devices, display devices for exhibition or information transmission, medical display devices, and the like.

The foregoing is illustrative of embodiments and is not to be construed as limiting thereof. Although some embodiments have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims, with functional equivalents to be included therein.

What is claimed is:

1. A pixel comprising:

a light emitting diode configured to output light based on a driving current, and comprising a first terminal, and a second terminal configured to receive a second power;

a transistor configured to generate the driving current, and comprising a first terminal configured to receive a first power, a second terminal electrically connected to the first terminal of the light emitting diode, and a gate terminal directly electrically connected to the first terminal of the transistor; and a capacitor comprising a first terminal configured to receive a data power and a second terminal electrically connected to the gate terminal of the transistor.

2. The pixel of claim 1, wherein the gate terminal of the transistor and the second terminal of the capacitor are directly electrically connected to a first node.

3. The pixel of claim 2, wherein the first terminal of the light emitting diode and the second terminal of the transistor are directly electrically connected to a second node.

4. The pixel of claim 3, wherein the first node is directly electrically connected to the second node.

5. The pixel of claim 3, wherein no transistor is electrically connected between the first node and the second node.

6. The pixel of claim 2, wherein a frame period for the pixel comprises:

an initialization period during which the gate terminal is initialized;

a compensation period during which a threshold voltage of the transistor is compensated;

a data writing period during which the data power is applied to the first node; and a light emitting period during which the light emitting diode emits light.

7. The pixel of claim 6, wherein the first power has a first voltage level, and a second voltage level that is greater than the first voltage level, wherein the data power has a third voltage level, and a fourth voltage level that is greater than the third voltage level, and wherein the second power has a fifth voltage level equal to the first voltage level, and a sixth voltage level that is equal to the second voltage level.

8. The pixel of claim 7, wherein, in the initialization period:

the first power has the first voltage level;

the data power has the third voltage level; and the second power has the fifth voltage level.

9. The pixel of claim 7, wherein, in the compensation period:

the first power has the second voltage level;

the data power has the third voltage level; and the second power has the sixth voltage level.

10. The pixel of claim 7, wherein, in the data writing period:

the first power has the first voltage level;

the data power has the fourth voltage level; and the second power has the fifth voltage level.

11. The pixel of claim 7, wherein, in the light emitting period:

the first power has the second voltage level;

the data power has the fourth voltage level; and the second power has the fifth voltage level.

12. The pixel of claim 2, wherein the transistor further comprises a back gate terminal configured to receive a back gate voltage.

13. The pixel of claim 12, wherein a frame period for the pixel comprises:

an initialization period during which the gate terminal is initialized;

a compensation period during which a threshold voltage of the transistor is compensated;

a data writing period during which the data power is applied to the first node; and a light emitting period during which the light emitting diode emits light, and wherein the back gate voltage having a negative polarity is applied to the back gate terminal in the compensation period.

14. The pixel of claim 1, wherein the first terminal of the capacitor is directly electrically connected to the data power.

15. A display device comprising:

a light emitting diode above a substrate;

an active pattern above the substrate, and comprising a source region configured to receive a first power, a drain region electrically connected to the light emitting diode, and a channel region between the source region and the drain region;

a first electrode above the substrate, and electrically connected to the light emitting diode; and a second electrode above the first electrode, and configured to receive a data power.

16. The display device of claim 15, wherein the first electrode and the light emitting diode are electrically connected through the drain region of the active pattern.

17. The display device of claim 15, further comprising a third electrode above the substrate, and configured to receive a back gate voltage.

18. The display device of claim 17, wherein the third electrode is located between the first electrode and the second electrode.

19. The display device of claim 15, wherein the first electrode is located between the active pattern and the second electrode.

20. The display device of claim 15, wherein the active pattern is located between the first electrode and the second electrode.

* * * * *